United States Patent
Cioffi et al.

(10) Patent No.: US 7,924,736 B2
(45) Date of Patent: Apr. 12, 2011

(54) DSL SYSTEM ESTIMATION

(75) Inventors: John M. Cioffi, Atherton, CA (US); Wonjong Rhee, San Francisco, CA (US); Bin Lee, Palo Alto, CA (US); Seong Taek Chung, Redwood City, CA (US); Georgios Ginis, San Mateo, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 325 days.

(21) Appl. No.: 11/995,194

(22) PCT Filed: Jul. 8, 2006

(86) PCT No.: PCT/US2006/026795
§ 371 (c)(1),
(2), (4) Date: Apr. 29, 2008

(87) PCT Pub. No.: WO2007/008835
PCT Pub. Date: Jan. 18, 2007

(65) Prior Publication Data
US 2008/0205501 A1 Aug. 28, 2008

Related U.S. Application Data

(63) Continuation-in-part of application No. 10/817,128, filed on Apr. 2, 2004.

(60) Provisional application No. 60/527,853, filed on Dec. 7, 2003, provisional application No. 60/698,113, filed on Jul. 10, 2005.

(51) Int. Cl.
*H04L 12/26* (2006.01)
(52) U.S. Cl. ....... 370/252; 370/241; 375/224; 379/1.03; 379/12; 379/32.04

(58) Field of Classification Search .................. None
See application file for complete search history.

(56) References Cited

U.S. PATENT DOCUMENTS
3,920,935 A 11/1975 Vierling et al.
(Continued)

FOREIGN PATENT DOCUMENTS
DE 10001150 7/2001
(Continued)

OTHER PUBLICATIONS

State Intellectual Property Office of P.R. China , "Notification of the First Office Action", Chinese Application No. 200480041373.8, (Apr. 4, 2008).

(Continued)

*Primary Examiner* — Ayaz R Sheikh
*Assistant Examiner* — Nicholas Sloms
(74) *Attorney, Agent, or Firm* — Blakely, Sokoloff, Taylor & Zafman

(57) ABSTRACT

Estimates of a communication system configuration, such as a DSL system, are based on operational data collected from a network element management system, protocol and users. The operational data collected from the system can include performance-characterizing operational data that typically is available in the OSL system via element-management-system protocols. Generated estimates and/or approximations can be used in evaluating system performance and directly or indirectly dictating/requiring changes or recommending improvements in operation by transmitters and/or other parts of the indication system. Data and/or other information may be collected using internal means or using system elements and components via e-mail and/or other extra means. The likelihood of the models accuracy can be based on various data, information and/or indicators of system performance, such as observed normal operational data, test data and/or prompted operational data that shows operating performance based on stimulation signals.

30 Claims, 11 Drawing Sheets

U.S. PATENT DOCUMENTS

| | | | |
|---|---|---|---|
| 4,736,444 A * | 4/1988 | Dhein | 379/33 |
| 5,465,287 A | 11/1995 | Egozi et al. | |
| 5,479,447 A | 12/1995 | Chow et al. | |
| 5,903,602 A * | 5/1999 | Torkkel | 375/222 |
| 5,999,540 A | 12/1999 | McGhee et al. | |
| 6,058,162 A | 5/2000 | Nelson et al. | |
| 6,091,713 A | 7/2000 | Lechleider et al. | |
| 6,278,485 B1 | 8/2001 | Franchville et al. | |
| 6,311,144 B1 | 10/2001 | Abu El Ata | |
| 6,414,942 B1 | 7/2002 | Ito et al. | |
| 6,417,672 B1 | 7/2002 | Chong | |
| 6,453,016 B1 | 9/2002 | Chea | |
| 6,456,694 B1 | 9/2002 | Posthuma | |
| 6,459,702 B1 | 10/2002 | Saaverda et al. | |
| 6,463,126 B1 | 10/2002 | Manica et al. | |
| 6,477,238 B1 | 11/2002 | Schneider et al. | |
| 6,510,184 B1 | 1/2003 | Okamura | |
| 6,534,996 B1 | 3/2003 | Amrany et al. | |
| 6,574,308 B1 | 6/2003 | Macdonald et al. | |
| 6,625,255 B1 | 9/2003 | Green et al. | |
| 6,658,052 B2 | 12/2003 | Krinsky et al. | |
| 6,801,601 B2 | 10/2004 | Kamali et al. | |
| 6,819,746 B1 | 11/2004 | Schneider et al. | |
| 6,829,330 B2 | 12/2004 | Beige et al. | |
| 6,856,936 B1 * | 2/2005 | Chen et al. | 702/159 |
| 6,870,901 B1 | 3/2005 | Gudmundsson et al. | |
| 6,895,081 B1 | 5/2005 | Schmidt et al. | |
| 6,970,415 B1 | 11/2005 | Galarza et al. | |
| 6,970,560 B1 | 11/2005 | Hench et al. | |
| 6,990,196 B2 | 1/2006 | Zeng et al. | |
| 7,068,755 B2 | 6/2006 | Qiu | |
| 7,216,268 B2 | 5/2007 | Ryckebusch et al. | |
| 7,272,209 B2 | 9/2007 | Jiang et al. | |
| 2001/0043647 A1 | 11/2001 | Belge | |
| 2002/0067802 A1 | 6/2002 | Smith et al. | |
| 2002/0075952 A1 | 6/2002 | Verbin et al. | |
| 2002/0114383 A1 | 8/2002 | Belge et al. | |
| 2002/0131537 A1 | 9/2002 | Storm et al. | |
| 2002/0172329 A1 | 11/2002 | Rashid-Farrokhi | |
| 2002/0176544 A1 | 11/2002 | Liu et al. | |
| 2003/0002658 A1 | 1/2003 | Belge et al. | |
| 2003/0007605 A1 | 1/2003 | Rosen et al. | |
| 2003/0026391 A1 | 2/2003 | Kamali et al. | |
| 2003/0086514 A1 * | 5/2003 | Ginis et al. | 375/346 |
| 2004/0086085 A1 | 5/2004 | Nordling et al. | |
| 2004/0095921 A1 | 5/2004 | Kerpez | |
| 2004/0120470 A1 | 6/2004 | Cambron et al. | |
| 2004/0258000 A1 | 12/2004 | Kamali et al. | |
| 2004/0264685 A1 | 12/2004 | Smith et al. | |
| 2005/0026572 A1 | 2/2005 | Dasgupta et al. | |
| 2005/0088267 A1 * | 4/2005 | Watts et al. | 336/178 |
| 2005/0123027 A1 | 6/2005 | Cioffi et al. | |
| 2005/0123030 A1 * | 6/2005 | Belge | 375/222 |
| 2005/0135566 A1 | 6/2005 | Schmidt et al. | |
| 2005/0213714 A1 | 9/2005 | Lanberg et al. | |
| 2006/0159162 A1 | 7/2006 | Shrikhande et al. | |
| 2006/0164101 A1 | 7/2006 | Fossion et al. | |
| 2006/0182169 A1 | 8/2006 | Belge et al. | |
| 2006/0291500 A1 | 12/2006 | Kroninger et al. | |
| 2007/0133787 A1 | 6/2007 | Verlinden et al. | |
| 2007/0274513 A1 | 11/2007 | Wang et al. | |

FOREIGN PATENT DOCUMENTS

| | | |
|---|---|---|
| EP | 0695100 | 1/1996 |
| EP | 1009135 | 6/2000 |
| EP | 1073247 | 1/2001 |
| EP | 1213669 | 6/2002 |
| GB | 1382087 | 1/1975 |
| GB | 2173974 | 10/1986 |
| WO | WO-00/64132 | 10/2000 |
| WO | WO-01/33823 | 5/2001 |
| WO | WO-01/35607 | 5/2001 |
| WO | WO-01/35611 | 5/2001 |
| WO | WO-01/35614 | 5/2001 |
| WO | WO-0135614 | 5/2001 |
| WO | WO-02/03152 | 1/2002 |
| WO | WO-02/05529 | 1/2002 |
| WO | WO-02/13009 | 2/2002 |
| WO | WO-02/13405 | 2/2002 |
| WO | WO-03/005598 | 1/2003 |
| WO | WO-2006/089888 | 8/2006 |
| WO | WO-2006092730 | 9/2006 |
| WO | WO-2007/012867 | 2/2007 |
| WO | WO-2007/098422 | 8/2007 |
| WO | WO-2007/103791 | 9/2007 |

OTHER PUBLICATIONS

"International Search Report", PCT Application No. PCT/IB2006/00496, 5 pgs.

"International Search Report & Written Opinion", International Application No. PCT/IB2004/003958, (Jul. 20, 2005), 19 pgs.

"ITU-T Recommendation G.993.2", *International Telecommunication Union*, Study Group 15, TD 168 (PLEN/15), (May 16-27, 2005), pp. 1-14, 84-94 and 158-161.

Aldana, Carlos, "Interference Estimation for Multicarrier Systems".

Cioffi, John M., et al., "Channel Identification with Dynamic Spectrum Management", ANSI Contribution T1E1.4/2001-147, (May 7, 2001), 8 pgs.

European Patent Office, "Office Action", European Application No. 04801291.8-2416, (Jul. 31, 2007), 4.

Jungwon, Lee, et al., "A Multiuser-User Rate and Power Control Algorithm for VDSL", *GLOBECOM '02*. Nov. 17-21, 2002. vol. 2., pp. 1264-1268.

Palomar, D.P., et al., "Optimum Joint Transmit-Receive Linear Processing for Vectored DSL Transmission with QoS Requirements", *36th Asilomar Conf. on Signals, Systems and Computers*. Nov. 3-6, 2002. vol. 1, pp. 388-392.

Starr, et al., "DSL Advances", Chapters 3, 7, and 11; Prentice-Hall, (2003).

USPTO, "Notice of Allowance", U.S. Appl. No. 10/817,128, (Jul. 23, 2007), 7.

USPTO, "Office Action", U.S. Appl. No. 10/817,128, (Oct. 31, 2006), 17.

USPTO, "Office Action", U.S. Appl. No. 10/817,128, (Apr. 19, 2007), 11.

Zeng, Chaohuang, et al., "Crosstalk Identification in xDSL Systems", *IEEE Journal on Selected Areas in Communications*. Aug. 2001. vol. 19, Issue 8., pp. 1488-1496.

Patent Cooperation Treaty, "International Search Report and Written Opinion", International Application No. US2006/026795, (Aug. 27, 2007), 10 pgs.

Non-Final Office Action for U.S. Appl. No. 11/069,159, Mailed Jan. 6, 2009, 13 pages.

European Patent Office, "First Office Action", European Application No. 06710513.0, (Jul. 25, 2008), Whole Document.

IP Australia, "First Official Report", Australian Patent Application No. 2004298117, (Dec. 1, 2008), 2 pages.

Office Action for Chinese Patent Application No. 200680027968.7, mailed Feb. 5, 2010, 18 pages.

Office Action for Chinese Patent Application No. 200680006774.9, mailed Jan. 29, 2010, 10 pages.

Office Action for U.S. Appl. No. 11/069,159, mailed Dec. 16, 2009, 8 pages.

Notice of Allowance for U.S. Appl. No. 11/945,210, mailed Nov. 19, 2009, 9 pages.

Office Action for U.S. Appl. No. 11/945,210, mailed May 11, 2009, 17 pages.

Office Action for Australia Patent Application No. 2006268292 mailed Feb. 12, 2010, 2 pages.

Office Action for U.S. Appl. No. 11/069,159, mailed Jan. 6, 2009, 13 pages.

Office Action for Chinese Patent Application No. 200680027968.7 (with translation), mailed May 8, 2009 15 pages.

Final Office Action for U.S. Appl. No. 11/069,159, mailed Jul. 10, 2009, 9 pages.

Office Action for European Application No. 06710513.0, mailed Jul. 25, 2008, 4 pages.

Office Action for Australian Patent Application No. 2004298117 mailed Dec. 1, 2008, 2 pages.
Notice of Acceptance for Australian Patent Application No. 2004298117, mailed Mar. 24, 2010, 3 pages.
Non-Final Office Action for European Application No. 06710513.0 Mailed Apr. 15, 2010, 5 pages.

Office Action for Japanese Patent Application No. 2008-521505 mailed Sep. 14, 2010, 3 pages.
Non-Final Office Action for Chinese Patent Application No. 200680006774.9, Mailed Sep. 7, 2010, 12 pages.

* cited by examiner

DSL SYSTEM ESTIMATION

CROSS-REFERENCE TO RELATED APPLICATIONS

This application is a continuation-in-part of U.S. Ser. No. 10/817,128 filed on Apr. 2, 2004, entitled DSL SYSTEM ESTIMATION AND PARAMETER RECOMMENDATION, which claims the benefit of priority under 35 U.S.C. §119(e) of U.S. Provisional No. 60/527,853 filed on Dec. 7, 2003, entitled DYNAMIC MANAGEMENT OF COMMUNICATION SYSTEM, the disclosures of which are incorporated herein by reference in their entirety for all purposes.

This application claims the benefit of claims the benefit of priority under 35 U.S.C. §119(e) of U.S. Provisional No. 60/698,113 filed on Jul. 10, 2005, entitled DSL SYSTEM, the disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

1. Field of the Invention

This invention relates generally to methods, systems and apparatus for managing digital communications systems. More specifically, this invention relates to estimating the configuration of one or more channels or lines in a communication system such as a DSL system.

2. Description of Related Art

Digital subscriber line (DSL) technologies provide potentially large bandwidth for digital communication over existing telephone subscriber lines (referred to as loops and/or the copper plant). "xDSL" and "DSL" are terms used to generally refer to digital subscriber line equipment and services, including packet-based architectures, such as ADSL, HDSL, SDSL, SHDSL, IDSL, VDSL and RADSL. DSL technologies can provide extremely high bandwidth over embedded twisted pair, copper cable plant and offer great potential for bandwidth-intensive applications. DSL services are much more dependent on line conditions (for example, the length, quality and environment of the copper loop) than traditional telephone services (typically using a bandwidth including frequencies up to about 4 kilohertz) compared to DSL services (using a bandwidth including frequencies up to 30 MHz).

While some local loops are in great condition for implementing DSL (for example, having short to moderate lengths with micro-filters or splitters installed and with no bridged taps and no bad splices), many local loops are not as suitable. For example, local-loop length varies widely, the wire gauge for a local loop may not be consistent over the length of the loop (having two or more different gauges spliced together), many loops do not have micro-filters or splitters properly installed, and many existing local loops have one or more bridged taps (a length of wire pair that is connected to a loop at one end and is unconnected or poorly terminated at the other end). Additionally, local loops may have bad splices or bad connectors, or they may have legacy devices (party-line systems, alarm systems, etc) connected in series with the loop. This type of line information is important to the evaluation of DSL systems and configurations and may mean that DSL loops differ and thus behave differently. Information may exist about individual lines, or can be determined using earlier techniques (for example, evaluation using voice-band measurement and loop-qualification methods). However, the accuracy of some of this information is questionable; it has been found that line quality varies widely, even among lines in the same group. Further, voice-band measurements do not always accurately reflect the DSL environment of loops. Therefore, techniques that evaluate a single line in each binder or other group, for example, and then extrapolate that information to all other lines in such a group, may not provide accurate information about those other lines or even the evaluated line itself.

Other techniques include characterizing DSL transmission lines using time-domain reflectometry, in which a predetermined test signal is sent from a point of origin to a DSL transmission line, the line reflects a portion of the signal back to the point of origin, and the reflected signal is analyzed to determine transmission line characteristics. In other situations, a reference loop might be analyzed and/or characterized to generate a transfer function and to model the effects of attenuation, noise, etc. on signals in the reference loop. Typically, one reference loop is selected in each binder or other group of lines and evaluated.

Systems, methods and techniques that permit modeling of DSL systems, including DSL binders and other groups, would represent a significant advancement in the art. In particular, management systems may provide only limited information nominally on the line and a system that could infer substantially more information from that limited information would represent a considerable advancement in the field of DSL service rates and associated ranges.

BRIEF SUMMARY OF THE INVENTION

Methods, systems, apparatus, computer program products and other embodiments of the present invention use estimates of a communication system configuration, such as a DSL system, that are based on operational data collected from a network element management system, protocol, users and/or the like. The operational data collected from the system can include performance-characterizing operational data that typically is available in a DSL system via element-management-system protocols. Generated estimates and/or approximations can be used in evaluating system performance and directly or indirectly dictating/requiring changes or recommending improvements in operation by transmitters and/or other parts of the communication system. Data and/or other information may be collected using "internal" means or may be obtained from system elements and components via email and/or other "external" means. The likelihood of a model's accuracy can be based on various data, information and/or indicators of system performance, such as observed normal operational data, test data and/or prompted operational data that shows operating performance based on stimulation signals. One example of such prompted data uses the Hlog of a given channel to obtain information regarding bridged taps, bad splices, and missing or misused micro-filters.

The system configuration sought to be approximated can include the loop configuration, the loop length, the presence of bridged taps, the length of bridged taps, the presence of a bad splice, the lack of a micro-filter or splitter, etc. Data may be collected once or over time, for example on a periodic basis, an on-demand basis or any other non-periodic basis, thus allowing the estimator to update its system configuration approximation, if desired.

Further details and advantages of the invention are provided in the following Detailed Description and the associated Figures.

BRIEF DESCRIPTION OF DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
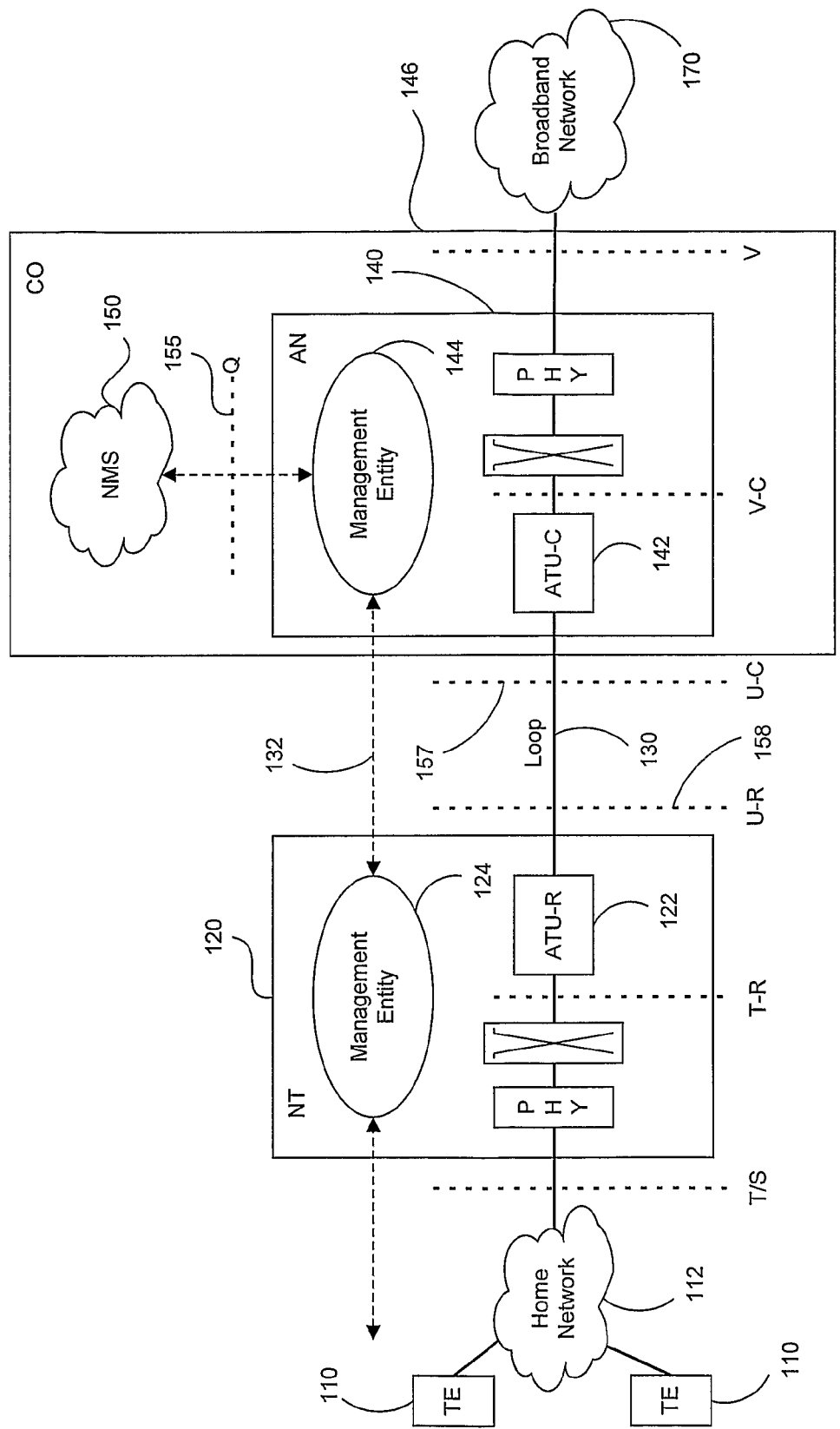
FIG. 1 is a schematic block reference model system according to the G.997.1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention estimate the configuration of a given xDSL system (also equivalently referred to as a DSL system) based on operational data collected from a network element management system, protocol or the like. Using an estimate thusly generated, a controller then controls the operational mode (or may recommend a mode), for example by setting users' data rates, transmit power levels, etc. While the exact configuration of the DSL system may not be determinable, the whole or partial approximation or estimate obtained using the present invention is nevertheless extremely valuable for various purposes, including but not limited to, assisting users in optimizing their use of the system or detecting lines whose performance can be significantly improved with minimal change of line configuration or identifying lines for which a technician intervention is needed. The operational data collected from the system can include performance-characterizing operational data that typically is available in a DSL system via element-management-system protocols. An estimator and/or controller (for example, a dynamic spectrum manager or other independent entity) can perform the methods and implement the present invention in various ways.

As described in more detail below, an estimator implementing one or more embodiments of the present invention can be part of a controller (for example, a dynamic spectrum manager or spectrum management center). These components can be a computer-implemented device or combination of devices that collect and analyze appropriate operational data. Generated estimates can be used in evaluating system performance and directly or indirectly dictating/requiring changes or recommending improvements in operation by transmitters operating on the system. The controller and/or estimator can be located anywhere. In some embodiments, the controller and/or estimator reside in the DSL CO, while in other cases they may be operated by a third party located outside the CO. The structure, programming and other specific features of a controller and/or estimator usable in connection with embodiments of the present invention will be apparent to those skilled in the art after reviewing the present disclosure.

The following examples of embodiments of the present invention will use DSL systems as exemplary communications systems. Within these DSL systems, certain conventions, rules, protocols, etc. may be used to describe operation of the exemplary DSL system and the information and/or data available from users and/or equipment on the system. However, as will be appreciated by those skilled in the art, embodiments of the present invention may be applied to various communications systems, and the invention is not limited to any particular system. The present invention can be used in any data transmission system for which knowledge of the system configuration would be valuable.

Various network management elements are used for management of DSL physical-layer resources, where elements refer to parameters or functions within a DSL modem pair, either collectively or at an individual end. A network-management framework consists of one or more managed nodes, each containing an agent. The managed node could be a router, bridge, switch, DSL modem or other. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which is incorporated herein in its entirety by reference for all purposes. This model applies to all ADSL systems meeting the various standards that may or may not include splitters, such as ADSL1 (G.992.1), ADSL-Lite (G.992.2), ADSL2 (G.992.3), ADSL2-Lite G.992.4, ADSL2+ (G.992.5) and the VDSL2 (G.993.2) standard, as well as the G.991.1 and G.991.2 SHDSL standards, all with and without bonding. This model is well known to those skilled in the art.

The G.997.1 standard specifies the physical layer management for DSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that is available at an access node (AN).

In FIG. 1, users' terminal equipment 110 is coupled to a home network 112, which in turn is coupled to a network termination unit (NT) 120. NT 120 includes an ATU-R 122 (for example, a transceiver defined by one of the ADSL standards) or any other suitable network termination modem, transceiver or other communication unit. NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other central location. In FIG. 1, ATU-C 142 is located at an access node (AN) 140 in a CO 146. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL typically is a telephone twisted pair that also carries other communication services.

Several of the interfaces shown in FIG. 1 are used for determining and collecting performance data. The Q-interface 155 provides the interface between the NMS 150 of the operator and ME 144 in AN 140. All parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 122 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in Technical Report TR-005, entitled "ADSL Network Element Management" from the ADSL Forum, dated March 1998, which is incorporated herein by reference in its entirety for all purposes. Also, DSL Forum TR-069, entitled "CPE WAN Management Protocol" from the DSL Forum, dated May 2004 is incorporated herein by reference in its entirety for all purposes. Also, DSL Forum TR-064, entitled "LAN-Side DSL CPE Configuration Specification" from the DSL Forum, dated May 2004 is incorporated herein by reference in its entirety for all purposes. These documents address different situations for CPE side management. Also, NIPP-NAI draft technical report "Dynamic Spectrum Management Technical Report," contribution number NIPP-NAI-2006-028R2, dated June 2006 addresses several situations for CO and CPE side management.

As will be appreciated by those skilled in the art, at least some of the parameters described in these documents can be used in connection with embodiments of the present invention. Moreover, at least some of the system descriptions are likewise applicable to embodiments of the present invention. Various types of operational data and information available from an ADSL NMS can be found therein; others may be known to those skilled in the art.

In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk because it is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
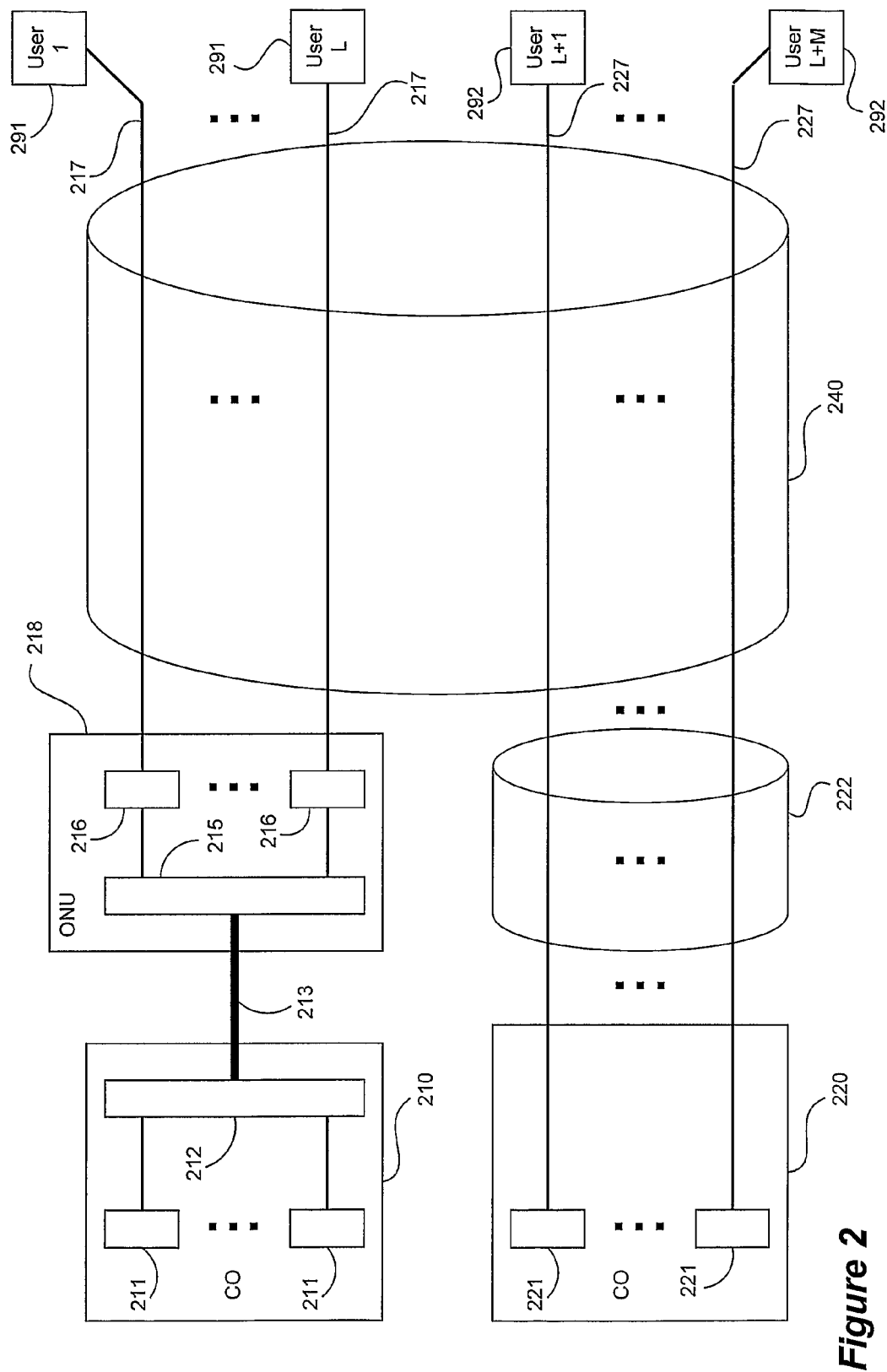
FIG. 2 is a schematic block diagram of a generic, exemplary DSL deployment.

A generic, exemplary DSL deployment scenario is shown in FIG. 2. All the subscriber loops of a total of (L+M) users 291, 292 pass through at least one common binder. Each user is connected to a Central Office 210, 220 through a dedicated line. However, each subscriber loop may be passing through different environments and mediums. In FIG. 2, L users 291 are connected to CO 210 using a combination of optical fiber 213 and twisted copper pairs 217, which is commonly referred to as Fiber to the Cabinet (FTTCab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and the users 291.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder.

As can be seen in FIG. 2, the lines from the CO 220 to the users 292 share the binder 222, which is not used by the lines between CO 210 and users 291. Moreover, another binder 240 is common to all lines to/from CO 210 and CO 220 and their respective users 291, 292.

Figure 3A:
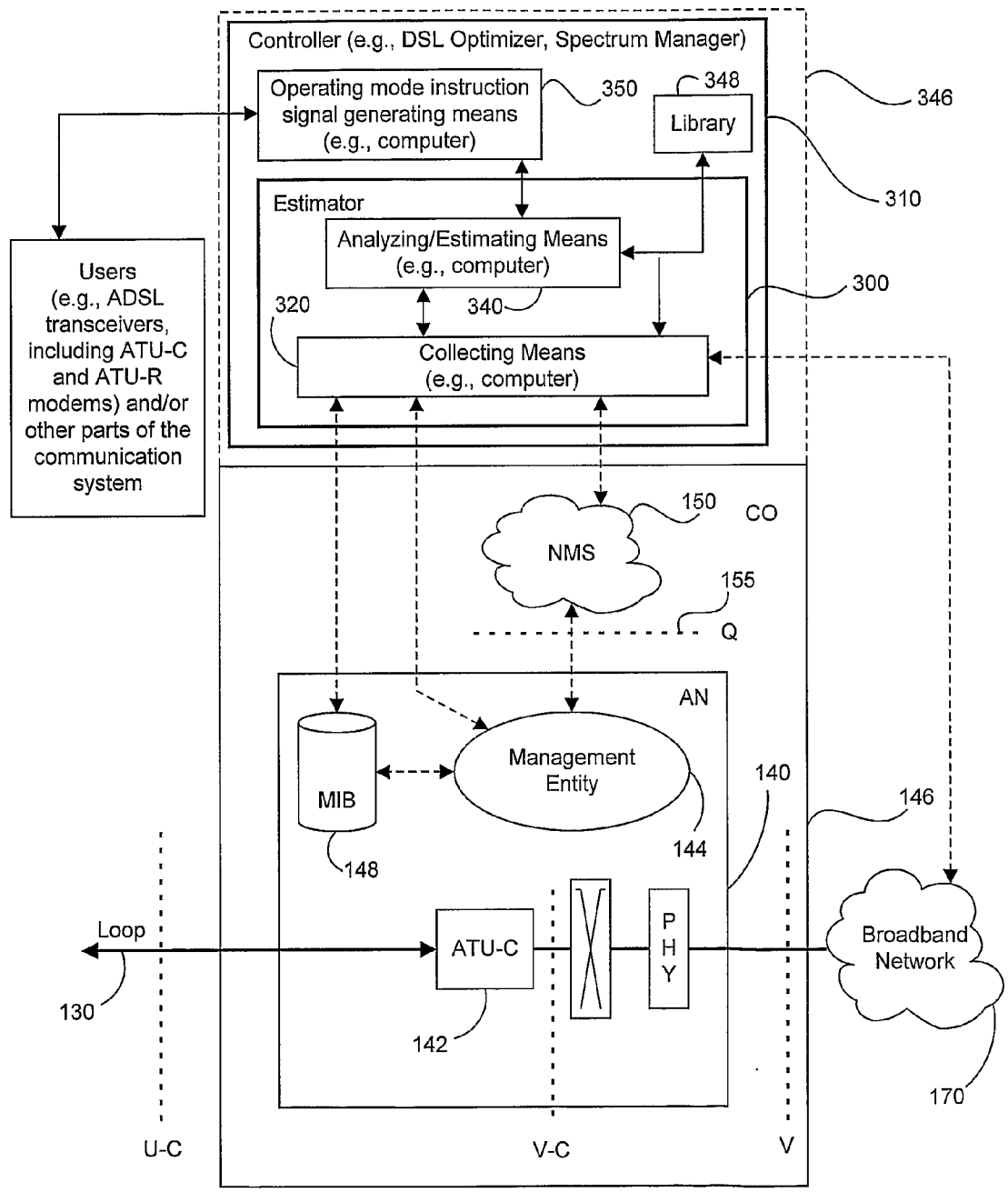
FIG. 3A is a controller including a model-based control unit according to one embodiment of the present invention.

According to one embodiment of the present invention shown in FIG. 3A, an estimator 300 may be part of an independent entity monitoring a DSL system as a controller 310 (for example, a dynamic spectrum manager) assisting users and/or one or more system operators or providers in optimizing their use of the system. Such a dynamic spectrum manager can benefit greatly from knowing an exact or approximate system configuration. (A dynamic spectrum manager may also be referred to as a Dynamic Spectrum Management Center, DSL optimizer, DSM Center, System Maintenance Center or SMC.) In some embodiments, the controller 310 may be an ILEC or CLEC operating a number of DSL lines from a CO or other location. As seen from the dashed line 346 in FIG. 3A, controller 310 may be in the CO 146 or may be external and independent of CO 146 and any company operating within the system. Moreover, controller 310 may be connected to and/or controlling multiple COs. In the exemplary system of FIG. 3A, the estimating means 340 is coupled to an operating mode instruction signal generating means 350 in the controller 310. This signal generator 350 is configured to generate and send operating mode instruction signals to users in the communication system (for example, ADSL transceivers). These instructions may include acceptable data rates, transmit power levels, coding and latency requirements, etc.

The system configuration sought to be approximated can include the loop configuration, the loop length, the presence of bridged taps, the length of bridged taps, the presence of a bad splice, the lack of a micro-filter or splitter, the presence of some legacy device in the loop, etc. As will be appreciated by those skilled in the art, if the controller/dynamic spectrum manager is a wholly independent entity (that is, not owned and/or operated by the company owning and/or operating lines within the CO), much of the system configuration information is unavailable. Even in cases where a CLEC or ILEC functions as the controller 310, much of the system configuration data may be unknown.

The estimator 300 includes a data collection unit 320 identified as a collecting means and a data analysis unit 340 identified as analyzing means. As seen in FIG. 3A, the collecting means 320 (which can be a computer, processor, IC, computer module, etc. of the type generally known) may be coupled to NMS 150, ME 144 at AN 140 and/or the MIB 148 maintained by ME 144, any or all of which may be part of an ADSL and/or VDSL system for example. Data also may be collected through the broadband network 170 (for example, via the TCP/IP protocol or other means outside the normal internal data communication within a given DSL system). One or more of these connections allows the estimator to collect operational data from the system and, if appropriate, elsewhere. Data may be collected once or over time. In some cases, the collecting means 320 will collect on a periodic basis, though it also can collect data on-demand or any other non-periodic basis (for example, when a DSLAM or other component sends data to the model-based control unit), thus allowing the estimator 300 to update its system information, configuration approximation, etc., if desired.

Data collected by means 320 is provided to the analyzing means 340 (which also can be a computer, processor, IC, computer module, etc. of the type generally known) for analysis and any decision regarding system estimation or the like to be used in operating one or more DSL lines being used to transmit data and/or in the determination of how to configure operation of one or more DSL lines in a given DSL system.

In the exemplary system of FIG. 3A, the analyzing means 340 is coupled to a signal generating means 350 in the controller 310. This signal generator 350 (which can be a computer, processor, IC, computer module, etc.) is configured to generate and send instruction signals to modems and/or other components of the DSL system (for example, ADSL and/or VDSL transceivers and/or other equipment, components, etc. in the system). These instructions may include instructions regarding data rates, transmit power levels, coding and latency requirements, retraining scheduling and implementation, system configuration instructions, etc. The instructions may be generated after the controller 310 determines whether operational assumptions about the DSL system (for example, the presence, absence, locations, etc. of bridged taps, bad splices, micro-filters, etc.) are consistent with the estimated system configurations derived by the analyzing means 340 as a basis for configuring and/or controlling operation of a DSL system coupled to the controller 310.

Embodiments of the present invention can utilize one or more databases, libraries or other collections of data pertaining to collected operational data, previously constructed system configurations/estimates, etc. This collection of reference data may be stored, for example, as a library 348 in the controller 310 of FIG. 3A and used by the analyzing means 340 and/or collecting means 320.

In some embodiments of the present invention, the estimator 300 may be implemented in a computer such as a PC, workstation or the like. The collecting means 320 and estimating means 340 may be software modules, hardware modules or a combination of both, as will be appreciated by those skilled in the art. For management of large numbers of lines, databases may be introduced and used to manage the volume of data generated by the lines.

Figure 3B:
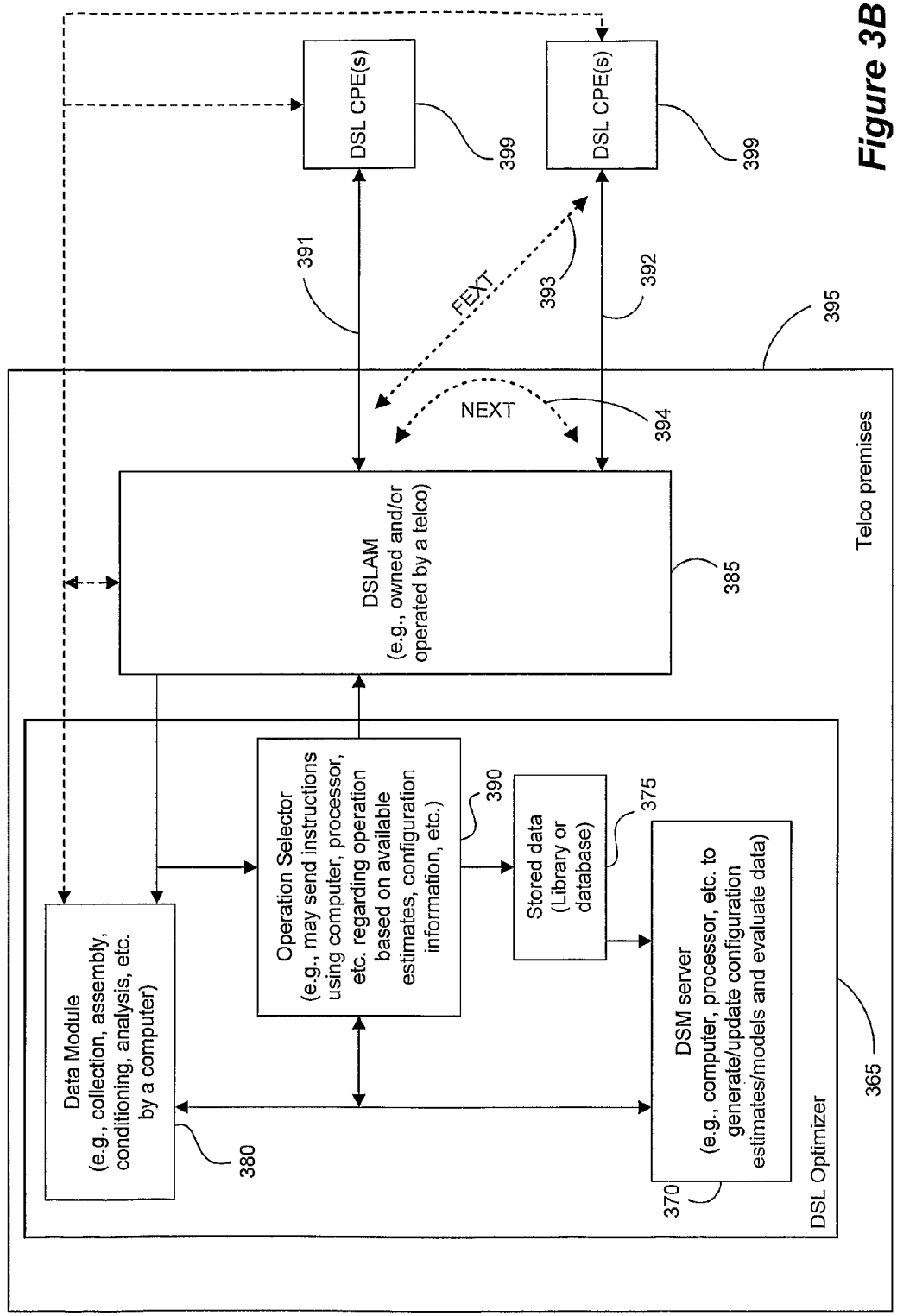
FIG. 3B is a DSL optimizer according to one embodiment of the present invention.

Another embodiment of the present invention is shown in FIG. 3B. A DSL optimizer 365 (acting as a controller) operates on and/or in connection with a DSLAM 385 or other DSL system component (for example, an RT, ONU/LT, etc.), either or both of which may be on the premises 395 of a telecommunication company (a "telco"). The DSL optimizer 365 includes a data module 380, which can collect, assemble, condition, manipulate and/or supply operational data for and to the DSL optimizer 365. Module 380 can be implemented in one or more computers such as PCs or the like. Data from module 380 is supplied to a DSM server module 370 for analysis (for example, determining the availability and reliability of operational data, construction of models, estimated configurations, etc. based on collected operational data for given communication lines, control and operational changes to the communication system based on any estimated configurations or estimated defects, etc.). Information also may be available from a library or database 375 that may be related or unrelated to the telco.

An operation selector 390 may be used to implement signals affecting operation of the communication system. Such decisions may be made by the DSM server 370 or by any other suitable manner, as will be appreciated by those skilled in the art. Operational modes selected by selector 390 are implemented in the DSLAM 385 and/or any other appropriate DSL system component equipment. Such equipment may be coupled to DSL equipment such as customer premises equipment 399. Device 385 can be used to implement any ordered changes based on configurations, defects, etc. considered by the DSL optimizer 365. The system of FIG. 3B can operate in ways analogous to the system of FIG. 3A, as will be appreciated by those skilled in the art, though differences are achievable while still implementing embodiments of the present invention.

Various types of operational data can be collected in DSL systems in connection with embodiments of the present invention, for example: (1) channel average attenuation measurements (e.g. LATN, SATN), (2) channel bit distributions, (3) channel transmit power levels, (4) reported current data rates, (5) reported maximum attainable data rates, (6) reported error-correction-parity and/or other overheads, (7) use of trellis codes, (8) ATM or other protocol cell counts (which denote user activity levels), (9) time stamps for evaluating mutual effects and absolute time-dependent line conditions, (10) vendor identification and serial numbers, (11) time stamp for a major change in transmission parameters as in retraining, (12) the number of major changes in parameters or attempts to change parameters, and/or (13) code violations, FEC violations, and/or errored second counts.

Additionally, data may be collected in DSL systems that may further include, for example: (14) frequency-dependent measured channel insertion loss, gain, phase, and/or logarithmic magnitude; (15) frequency-dependent measured quiet-line or active-line noise levels, (16) transmitted PSD levels, (17) signal-to-noise ratios, (18) bits and gains quantities from bit-swapping, (19) echo responses and/or input impedances, (20) worst-case noise changes and associated times, (21) detailed FEC error location indications, (22) carrier masks (CARMASK of G.997.1 or similar), (23) tone-spectral shaping parameters (for example, the TSSpsds, TSSpsus, PSD-MASK, DPBOSHAPED, UPBOKLE and/or UPBOSHAPED elements in G.997.1), (24) vectored or matrix channel characterizing data, (25) the frequency/tone index of highest noise change in a recent interval of time, (26) the total number of bit-swaps occurring in a recent time interval, (27) the distribution of FEC errors, code violations and/or errored seconds violations over several successive sub-intervals of an interval programmed by a dynamic spectrum manager or determined in another way, (28) the peak-to-average ratio of noise or MSE measurements and/or variations over a recent time interval, and/or (29) higher-level protocol-throughput measures. As more types of operational data and means for acquiring such data become available, embodiments of the present invention can be upgraded to provide more accurate system estimates and better recommendations regarding system parameters and operations.

Operational data is collected from a DSL loop, line, system, etc., sometimes referred to herein as a "test loop." The test loop can be a normally operating and/or implemented DSL system that is being tested or is otherwise under consideration to obtain an estimate, configuration approximation or other useful model or information about the test loop. In embodiments of the present invention, the collected data are used to constitute, generate, derive, etc. a test loop parameter vector that includes one or more loop-dependent quantities, values, etc. that, either alone or in combination, can be used to estimate the loop configuration. The test loop parameter vector may include directly collected parameters such as average attenuation in one or more bands, loop attenuation per tone, etc., as outlined above. Such loop-dependent quantities may have to undergo smoothing in order to reduce large measurement variation from sample to sample, which may otherwise conflict with some of the methods described herein.

Alternatively, when loop attenuation per tone is not directly available, the test loop parameter vector also might include derived parameters such as an estimate of the noise per tone, based on an assumption of an ideal loop without any bridged taps, bad splices, missing or misused micro-filters or other faults. This noise per tone will be referred to herein as MSE noise (Mean-Square-Error noise) or MSE function. The MSE noise can be estimated at any time by the following formula (using dB):

$$MSE[n]=PSD[n]+H\log[n]-SNR[n] \quad \text{Equation (1)}$$

The PSD[n]=REFPSD+G[n] (where G[n] is the known or estimated gains table value in dB), and REFPSD=NOMPSD−PCB, which can also be known or estimated. Since G[n] usually satisfies −2.5 dB<G[n]<2.5 dB in ADSL1 modems, but might not be reported, G[n] can be estimated by looking for B[n] table changes, usually being near −2.5 dB on the tone with higher number of bits between two adjacent tones and usually near +2.5 dB on the tone with lower number of bits between two adjacent tones. In VDSL2, PSD[n]=MREFPSD[n]+G[n], where MREFPSD[n] is a reported parameter. SNR[n] may be obtained either directly from reported parameters (for example in ADSL2/2+ and VDSL2), or indirectly using the approximation $SNR[n] \approx 10^{Gap/10} \times (2^{B[n]}-1)$ (where Gap in dB is approximated by (9.5+TSNRM−CODEGAIN) and B[n] is typically reported by modems. Finally, Hlog[n] can be estimated using known models for the attenuation of the transmission line corresponding to the ideal twisted pair, and based on an estimate of the loop length or based on the average attenuation in one or more bands. When the loop attenuation per tone is not directly available, then the above estimate of MSE[n] using the Hlog[n] estimate for an ideal transmission line implicitly includes information about transmission line imperfections such as bridged taps, bad splices, loop faults, and missing or misused micro-filters.

For the estimation of the loop configuration in embodiments of the present invention, one or more test loop parameter vectors and/or the collected data from a DSL system are compared against reference values (for example, a reference parameter vector) to detect a specific condition on the loop and to further characterize the condition on the loop. In the description that follows, generating and comparing the reference parameter vector and/or values are described in detail for each of a variety of exemplary conditions that can be detected and characterized on a loop using embodiments of the present invention.

One undesirable condition/characteristic in a DSL loop is the presence of a bridged tap. A bridged tap is a length of superfluous wire pair that is connected to a loop at one end of the superfluous pair and unterminated/unconnected at the other end. This is undesirable because the reflection of signals from unterminated bridged taps result in signal loss and distortion. Bridged taps may be present inside and/or outside the customer's premises.

Figure 4:
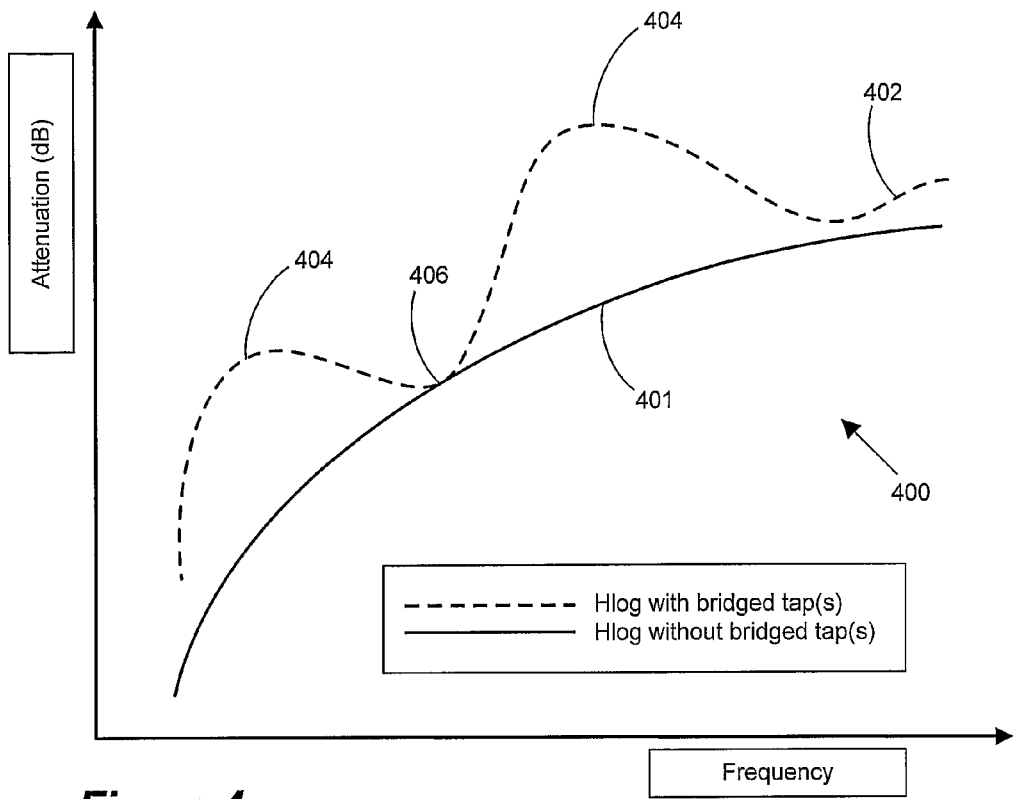
FIG. 4 is a plot of the difference between a test loop parameter vector for a DSL line with a bridged tap and a reference parameter vector for a DSL line without a bridged tap according to one or more embodiments of the present invention.

In one embodiment of the present invention, the presence of one or more bridged taps can be detected by comparing the measured loop attenuation per tone (for example, using a test loop parameter vector comprising directly measured and/or derived operational data and/or information) to a model attenuation per tone for a hypothetical loop that does not include a bridged tap (a reference parameter vector). FIG. 4 shows a plot 400 illustrating the difference between the plot 402 of an attenuation per tone with a bridged tap (a test loop parameter vector) and the plot 401 of an attenuation per tone without any bridged tap at the same loop length (a reference parameter vector). As seen in FIG. 4, the attenuation per tone with a bridged tap 402 exhibits some positive peaks 404 compared to the attenuation per tone without a bridged tap 401. Moreover, the attenuation per tone with a bridged tap 402 exhibits some negative peaks 406, which are less sharp than the positive peaks, however. The positive peaks 404 occur because of destructive combining of the signal with the signal reflected from the open end of the bridged tap. This destructive combination occurs only at certain frequencies and gives rise to the peaks of FIG. 4.

For a bridged tap with length of x, the destructive combining happens under the following condition:

$$2x = \frac{v}{f}\left(n + \frac{1}{2}\right) (n \text{ should be an integer.}) \qquad \text{Eq. (2)}$$

where v corresponds to the velocity of the signal in the copper wire, and f corresponds to the frequency of the signal. For 24/26 AWG, it is proper to use $v=2\cdot10^8$ (m/sec). Then, Table 1 can be constructed to locate the positive peaks.

TABLE 1

Location of positive peaks with respect to the length of the bridged tap

| x (ft) | 1$^{st}$ positive peak | 2$^{nd}$ positive peak | 3$^{rd}$ positive peak |
|---|---|---|---|
| 100 | 1.64 MHz | 4.92 MHz | 8.20 MHz |
| 200 | 0.82 MHz | 2.46 MHz | 4.10 MHz |
| 500 | 0.33 MHz | 0.98 MHz | 1.64 MHz |

A table for negative peaks can similarly be constructed by calculating the frequencies of constructive combining of the signals an using the equation $$2x = \frac{v \cdot n}{f} (n \text{ should be an integer.}) \qquad \text{Eq. (3)}$$

Thus, by detecting the positive peaks and the negative peaks in the measured attenuation per tone, a bridged tap can be identified and the length of a bridged tap can be estimated.

Detection of either a positive or negative peak is straightforward to one skilled in the art once an embodiment of the present invention has been implemented to provide a test loop parameter vector and a reference parameter vector. In one embodiment of the present invention, an error function is formed by subtracting the measured attenuation per tone from the attenuation per tone for a hypothetical loop that does not include a bridged tap (reference model loop), and which has a length approximately equal to the length of the actual loop. (Loop length can be estimated through a variety of techniques known to those skilled in the art, such as computing the average attenuation over a group of tones, or estimating the slope of the function of attenuation per tone.) A derivative of the error function may then be computed, and a positive peak can be detected by finding the point where the derivative of the error function turns from positive to negative. A negative peak can be detected by finding the point where the derivative of the error function turns from negative to positive. The size of the peak can be estimated by measuring the slope at the point where the derivative of the error turns from positive to negative (positive peak), or from negative to positive (negative peak).

After identifying the positive and/or negative peaks, the peaks' locations can be used to declare the presence of one or more bridged taps and to estimate the loop length of the one or more bridged taps. As an example, if positive peaks are detected at frequencies of 1.64 MHz, 4.92 MHz and 8.2 MHz, and negative peaks are detected at frequencies of 3.28 MHz, 6.56 MHz and 9.84 MHz, then a bridged tap is declared, and its estimated length is 100 ft.

The measured attenuation per tone may contain measurement and other errors, thus the positive and negative peaks may be difficult to detect or may be mis-detected. To reduce false positive detections, the detection of a peak can depend on both detection of a change in the derivative of the error, and also on the size of the peak exceeding a threshold value. A bridged tap of certain length is declared only if a certain number of positive peaks and a certain number of negative peaks are observed. The observed peaks must occur at frequencies that correspond to those of Equations 2 and 3 for the hypothesized bridged tap length. The sensitivity of the method described above can be tuned by adjusting the threshold for the size of the peak, and the thresholds for the number of peaks that must be detected before declaring a bridged tap.

In another embodiment of the present invention, the attenuation per tone can be replaced by MSE[n], where MSE[n] is calculated with an assumption of an ideal loop without any bridged taps, bad splices, missing or misused micro-filters or other faults (such an assumption provides a reference parameter vector). As above, an error function subtracts MSE[n] (provided as or in the loop-dependent parameter vector) from the average of MSE[n] over all tones or over groups of tones (used as or in the reference parameter vector). A derivative of an error function can then be computed, and the procedure can proceed in a manner similar to that described above.

Figure 5:
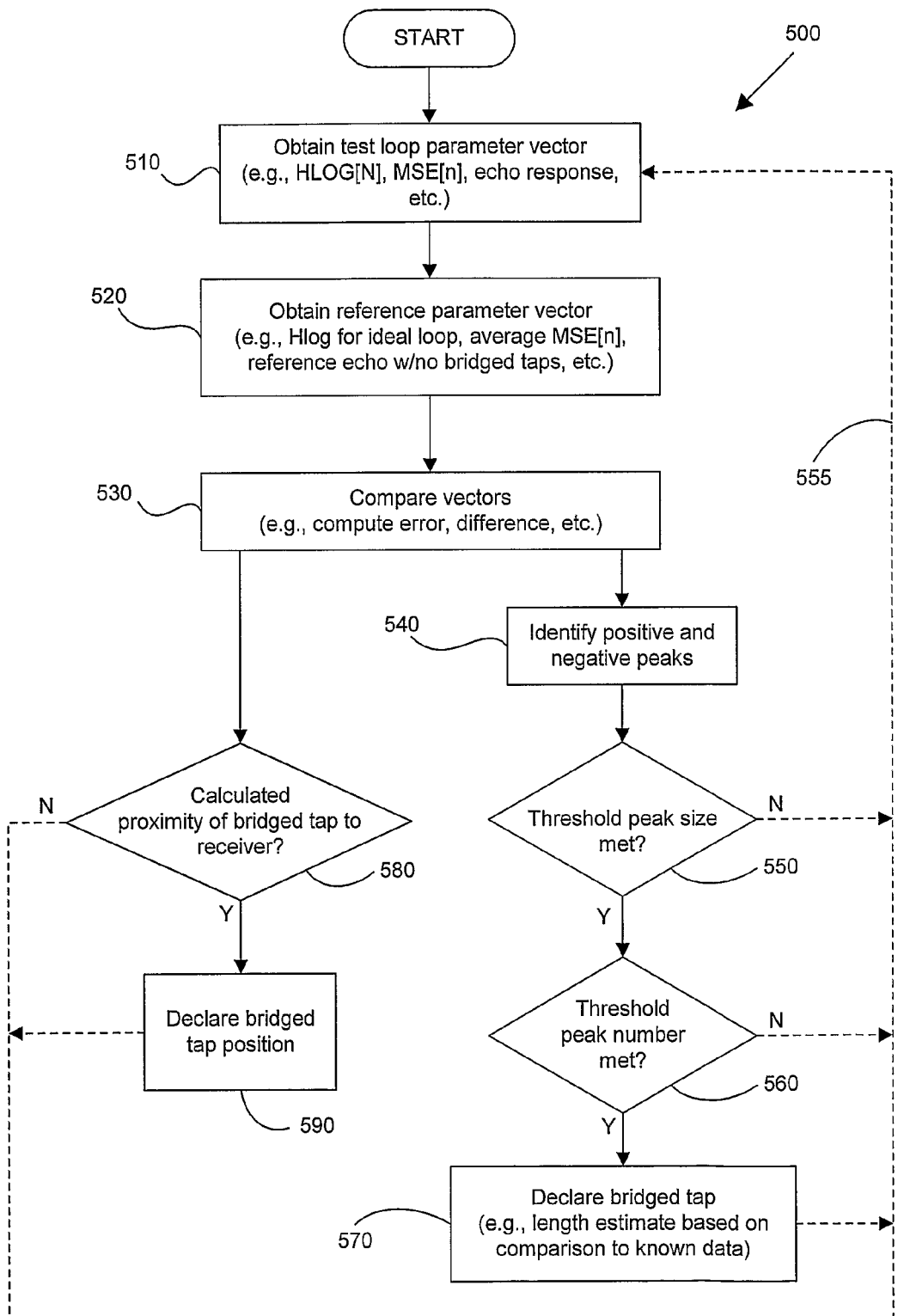
FIG. 5 is a flow diagram of one or more methods according to one or more embodiments of the present invention.

Methods for detecting a bridged tap and estimating a detected bridged tap's length are shown in FIG. 5. Process 500 starts with obtaining a test loop parameter vector at 510. This can be done in any appropriate manner, for example, by collecting/calculating HLOG[n], collecting/deriving MSE[n] in accordance with Equation (1) and the explanation thereof, above), etc. A reference parameter vector is then obtained at 520. At 530 the test loop parameter vector and reference parameter vector are compared. This can involve computing an error quantity and/or the difference between the two vectors obtained in 510, 520 above or in any other suitable fashion. Positive and negative peaks can then be identified at 540. The size and number of the identified peaks can be checked at 550, 560, after which a bridged tap can be declared, if appropriate, at 570. As noted by the dotted line 555, the process 500 can be repeated for other lines so that groups of lines (for example, a binder) can be checked using embodiments of the present invention. Also, using return line 555, other tests/estimations can be performed on the same line (for example, finding a bridged tap position, as described in detail below).

In another embodiment of this invention, information about the bridged tap's location can be estimated. After a bridged tap has been detected, then operational data may be used to approximate the distance between the DSLAM or other upstream-end equipment and the bridged tap, or between the CPE equipment and the bridged tap. Collected operational data such as the per tone receiver noise, MSE[n], the echo coupling response, the loop's complex impedance or other parameters derived from the above parameters can be used in a test loop parameter vector used to estimate the bridged tap location.

Figure 6:
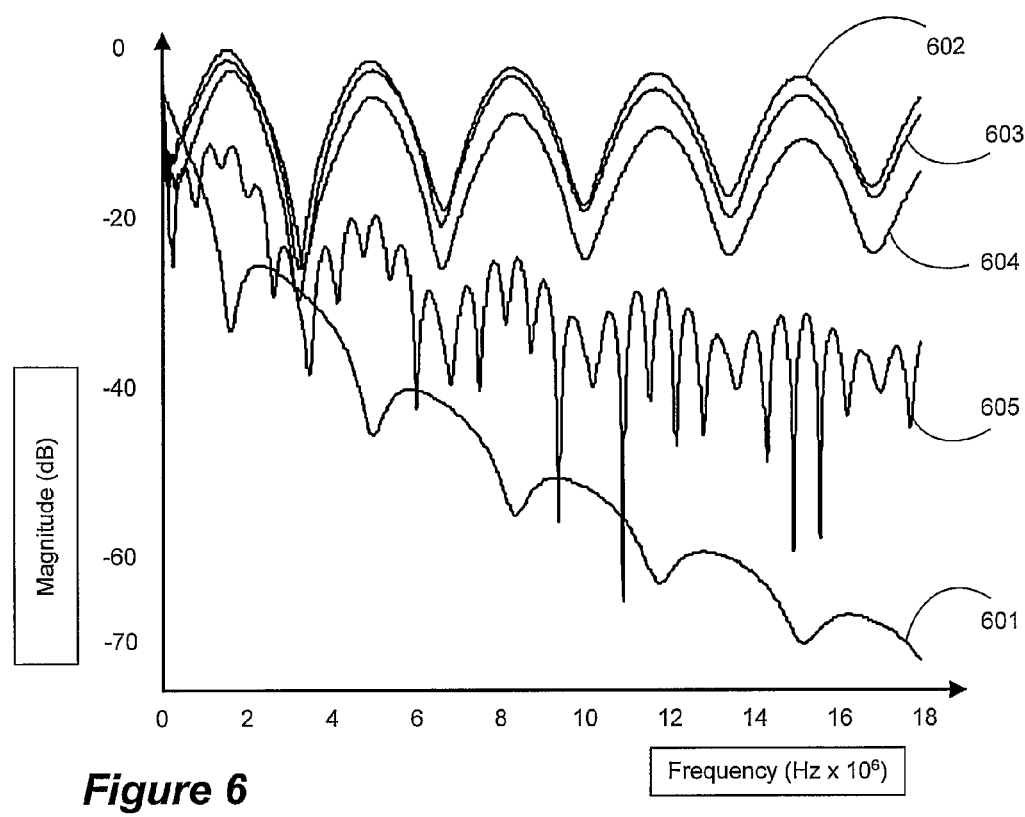
FIG. 6 shows the magnitude of channel frequency response and echo for a DSL line.

FIG. 6 shows the magnitude of the frequency responses of the channel and echo for a loop length of 2000 ft, and a bridged tap of 100 ft located at various distances from a CPE receiver. The channel with a bridged tap at 0 ft from an NT is shown as plot 601. Echo response is plotted with 602 showing the echo response at the NT with a bridged tap 0 ft from the NT; plot 603 shows the echo response at the NT with a bridged tap 30 ft from the NT; plot 604 shows the echo response at the NT with a bridged tap 100 ft from the NT; and plot 605 shows the echo response at the NT with a bridged tap 500 ft from the NT. FIG. 6 shows that the location of the bridged tap has a strong effect on the echo response, especially when the bridged tap is located very close to the CPE receiver. According to one embodiment of the present invention also reflected in FIG. 5, the measured echo response (as all or part of a test loop parameter vector) obtained at 510 is compared at 530 to a reference echo response (as all or part of a reference parameter vector) obtained at 520 corresponding to the case of no bridged tap. If the difference between the measured echo response and the reference echo response can be calculated at 580, then the calculated difference at one or more frequencies can be compared against threshold levels to determine the proximity of the bridged tap to the receiver at 590. A large difference indicates a large echo response and indicates that the bridged tap is close to the receiver. A small difference indicates a small echo response and indicates that the bridged tap is far from the receiver.

In other embodiments of the present invention, measured receiver noise, or measured impedance of the loop may be used instead of the echo response. These quantities are related, as is well known to those skilled in the art. The receiver noise is dependent on the echo response, because a strong echo response results in a higher noise level. Also, a measured loop impedance that strongly deviates from the impedance of the modem leads to a stronger echo response. Thus, a measured loop impedance or a measured receiver noise can be used to estimate the distance of a bridged tap from a receiver.

In another embodiment of the present invention, the presence of a bad splice can be detected by comparing the measured loop attenuation per tone to a model's attenuation per tone for a hypothetical loop that has an average attenuation that is equal to the average attenuation of the measured loop (reference).

Figure 7:
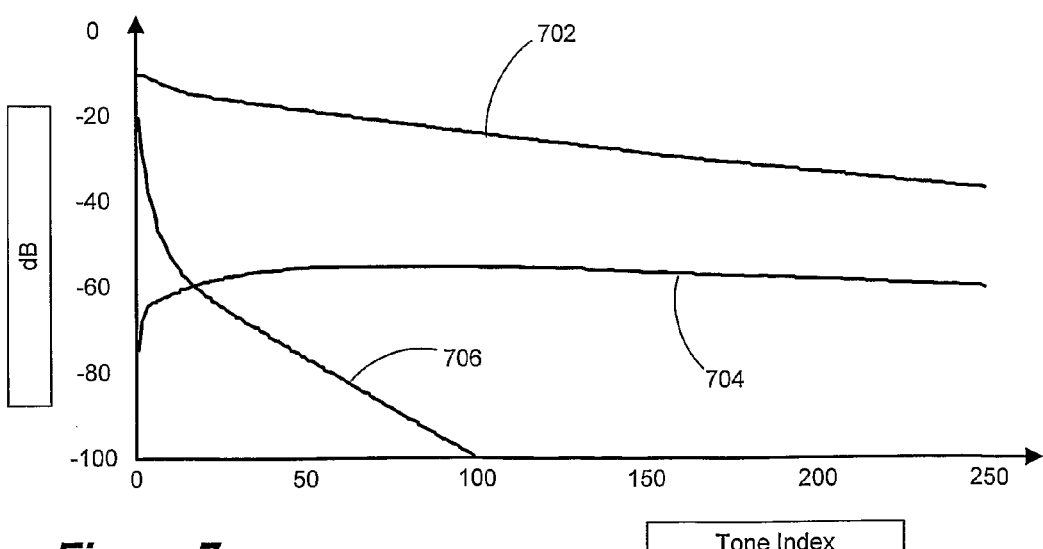
FIG. 7 is a plot of an insertion loss for a DSL loop with and without a bad splice.

FIG. 7 shows the insertion loss for a loop with length of 4.5 kft. In the absence of a bad splice, shown as plot 702, the insertion loss is small. When a bad splice is present, shown as plot 704 for a bad splice with C=50 pF, the insertion loss increases by a large amount particularly in the lower frequencies. If the average upstream attenuation is measured for the loop with the bad splice, then it is found to correspond to the average upstream attenuation of a very long loop without a bad splice shown as plot 706. Thus, the shape of the attenuation per tone changes significantly when a bad splice exists and results in excessive attenuation in the lower frequencies.

When the measured attenuation per tone is compared to a reference attenuation per tone for a hypothetical loop having the same average upstream attenuation, the comparison reveals the measured attenuation to be significantly stronger in the lower frequencies and significantly weaker in the higher frequencies. Alternatively, if HLOG[n] is the set of values computed for a hypothetical loop with the same average upstream attenuation as that measured, then the computed MSE[n] (as in Equation (1)) reaches very small levels in the higher frequencies that are unrealistic for conditions without a bad splice. Such observations can be used for the identification of a bad splice.

Figure 8:
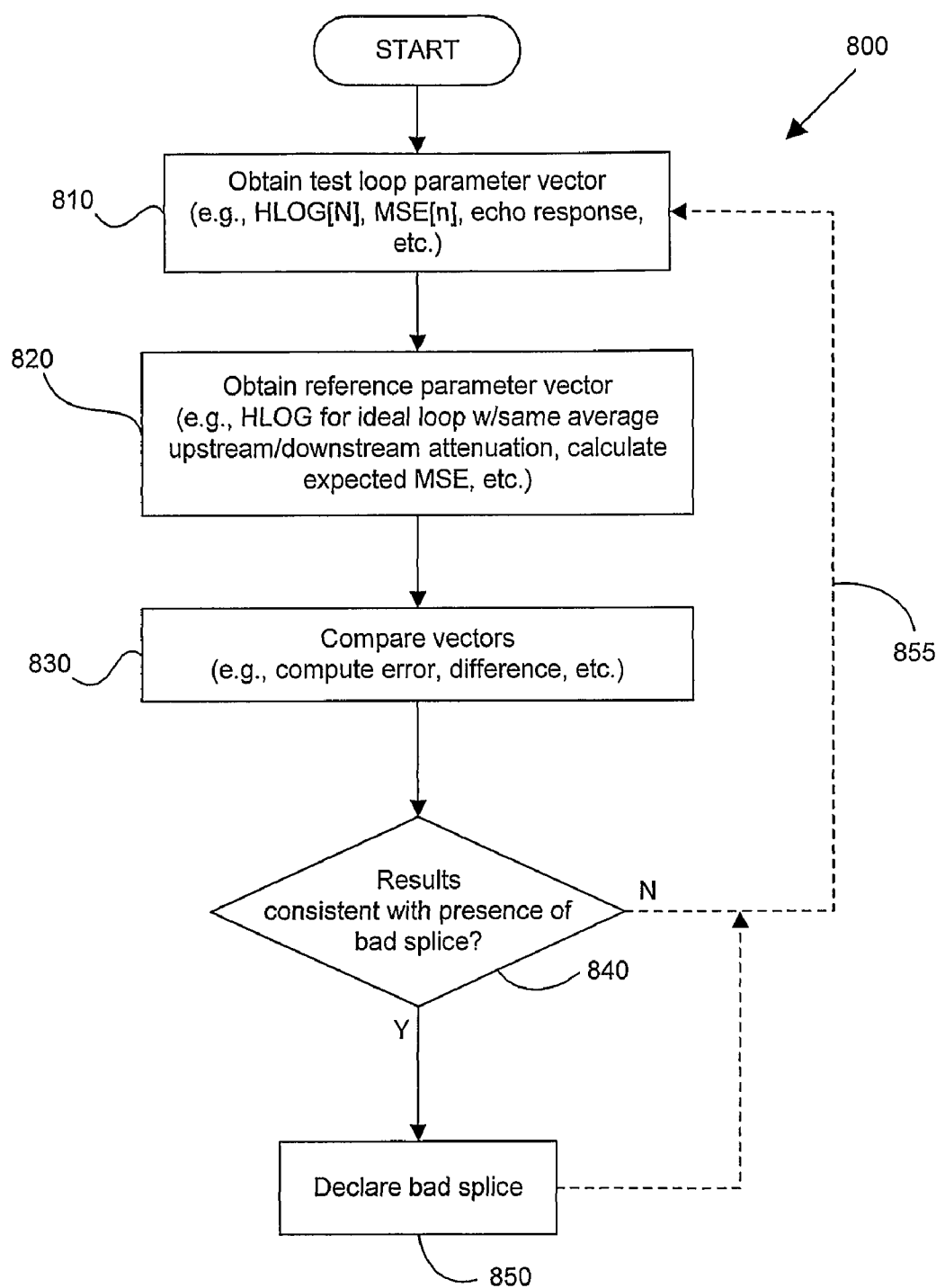
FIG. 8 is another flow diagram of one or more methods according to one or more embodiments of the present invention.

Methods for detecting a bad splice are shown in FIG. 8. Process 800 starts with obtaining a test loop parameter vector at 810. This can be done in any appropriate manner, for example, by collecting/calculating HLOG[n], collecting/deriving MSE[n] in accordance with Equation (1) and the explanation thereof, above), etc. A reference parameter vector is then obtained at 820 (for example by calculating HLOG[n] for an ideal loop with same average upstream attenuation or same average downstream attenuation, calculating expected MSE, etc.). At 830 the test loop parameter vector and reference parameter vector are compared. This can involve computing an error quantity and/or the difference between the two vectors obtained in 810, 820 above or in any other suitable fashion. The comparison results can be checked at 840 to determine if they are consistent with the presence of a bad splice (for example, check if an error for HLOG[n] exceeds a given threshold over a designated frequency range; check if MSE[n] is smaller than an expected MSE by more than a given threshold over a designated frequency range; etc.) Where a frequency set (for example, one or more frequencies) can be identified as being affected (for example, when computing the difference between the test loop and reference parameter vectors), the identified frequency set can be compared to a frequency range to declare the presence of a bad splice and, in some cases, the location of a declared bad splice. Where a frequency set is not identifiable, such as might be the case where an attenuation average is based on all usable frequencies, the identification of a bad splice can be based on the difference between the test loop and reference parameter vectors without regard to frequency.

A bad splice can be declared, if appropriate, at 850. As noted by the dotted line 855, the process 800 can be repeated for other lines so that groups of lines (for example, a binder) can be checked using embodiments of the present invention.

Figure 9:
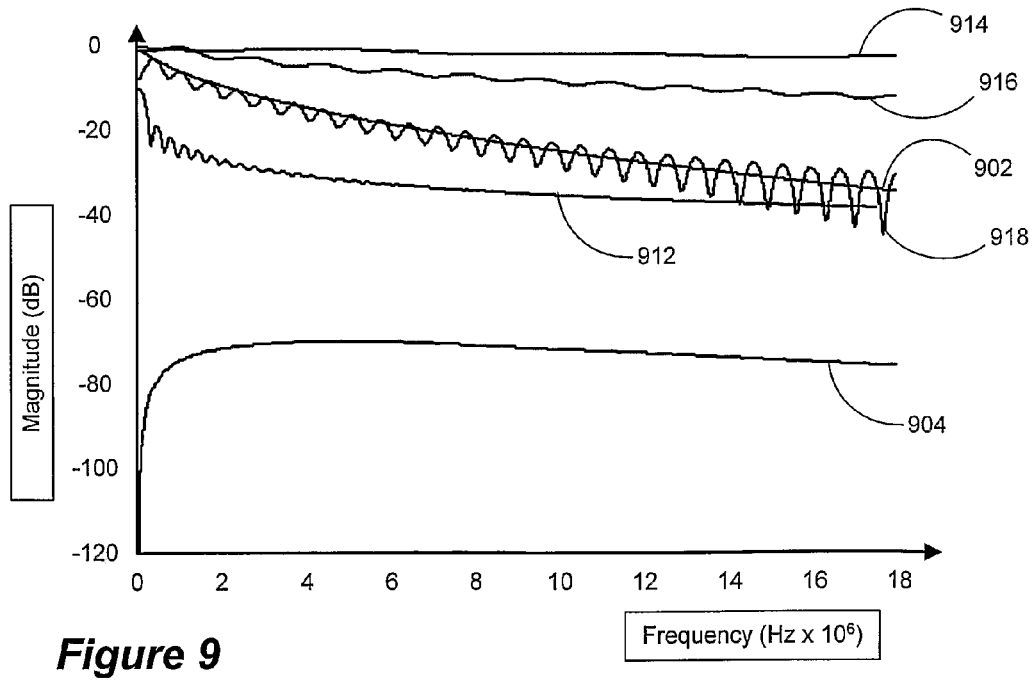
FIG. 9 is a plot of the magnitude of channel frequency responses and echo for a DSL system.

FIG. 9 shows the magnitude of the frequency responses of the channel and echo for a loop length of 1000 ft with and without a bad splice (capacitance of 4.7 nF connected in series with one of the wires) located at various distances from a CPE receiver. The location of the bad splice has a strong effect on the echo response, especially when the bad splice is very close to the CPE receiver. The channel without a bad splice is plot 902; the channel with the bad splice is plot 904. Similarly, the echo response without a bad splice is plot 912; plot 914 shows the echo response at the NT with a bad splice 50 ft from the NT; plot 916 shows the echo response at the NT with a bad splice 200 ft from the NT; and plot 918 shows the echo response at the NT with a bad splice 500 ft from the NT. In some embodiments of the present invention, the location of the bad splice can thus be estimated by comparing the measured echo response (as or part of a test loop parameter vector) to a reference echo response obtained from a hypothetical loop without a bad splice (as or part of a reference parameter vector). In other embodiments of the present invention, measured receiver noise, or measured impedance of the loop may be used instead of the echo response in or as the test loop parameter vector.

Embodiments of the present invention include analogously applying the techniques discussed above to identify other loop faults such as water-in-the-cable, grounding faults, cross-over faults, DC faults, resistance faults and others. All such fault detection techniques are part of the present invention. Also, embodiments of the present invention include applying techniques discussed above (comparing a test loop parameter vector with a reference parameter vector) to identify legacy devices connected in series or in parallel with the loop such as party-line systems, alarm systems and others. All such legacy device detection techniques are part of the present invention.

Certain faults and certain legacy devices cause degraded DSL performance during events such as phone calls or phone ringing. For example, certain legacy party-line systems are known to cause strong interference noise on DSL systems when POTS ringing is applied. If historical data such as a record or history of phone calls is available (for example, in a database, library and/or other information source), then this record can be used in conjunction with collected operational data. The phone call record would contain information such as the time and the duration of a phone call. Phone call records and information about DSL errors such as code violations, forward error correction anomalies, retraining/outage time information, errored seconds, severely errored seconds, unavailable seconds and others can then be correlated to examine if a phone call or a phone ring event caused errors on the DSL system. If correlation is detected, then the legacy of a corresponding legacy device may be declared.

When a micro-filter is missing from a DSL line, the POTS (Plain Old Telephone Service) signal or device (phone) might cause serious impairment to the DSL service. Similarly, if a micro-filter is incorrectly installed or incorrectly connected to the telephone line, then the DSL service can be seriously degraded. Therefore, it is important for operators to detect those lines with missing or misused micro-filters so that proper remedial action can be taken. Embodiments of the present invention provide techniques, apparatus, computer program products, etc. that can detect missing micro-filters in DSL lines.

A micro-filter is used to separate the low frequency band that is used by POTS and the high frequency band that is used by DSL. A micro-filter typically is installed between the telephone line and a POTS device to block high frequency interference from POTS to DSL, to prevent strong echo of an DSL upstream signal into DSL downstream, and to prevent changes of impedance seen from the DSL modem. All these effects otherwise degrade DSL performance.

A misused micro-filter (for example, one that is incorrectly installed between the telephone line and the DSL modem) may strongly attenuate the DSL signals and thus may also seriously degrade DSL performance. In embodiments of the present invention (including the claims), a "missing" micro-filter is defined as one or more problems with a micro-filter (that the micro-filter is physically absent, that the micro-filter misused, that the micro-filter is mis-installed, etc.).

The performance degradation caused by missing micro-filters may be dependent on the on-hook and off-hook status of a telephone. When the phone is on-hook, the performance degradation is different compared to the case when the phone is off-hook. When the phone is on-hook with ADSL systems, the performance degradation is small compared to the case with a proper micro-filter installed, and thus the ADSL system can usually operate at a reasonable data rate. This is because the impedance change and echo that is caused due to the phone is often small when the phone is on-hook. On the other hand, when the phone is off-hook with ADSL systems, the downstream (DS) data rate may be reduced by up to 3~6 Mbps due primarily to large upstream (US) signal echo that is injected into DS signals. The US data rate also may be reduced when the phone is off-hook, but the reduction is smaller than the DS reduction. As a result, when the phone is picked up, a DSL modem running at a high DS data rate is likely to retrain and re-synch to a much lower data rate or may be unable to complete training and may remain inoperative.

Figure 10:
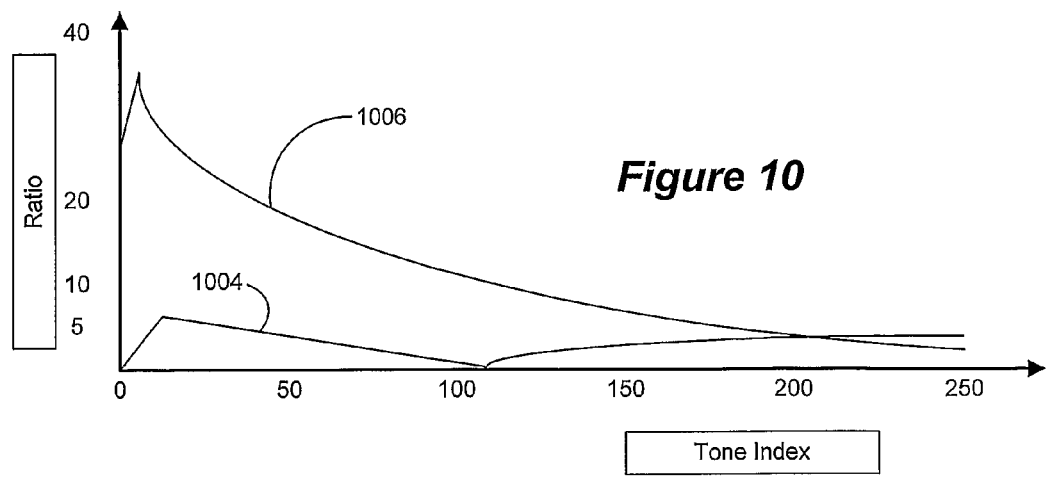
FIG. 10 illustrates the ratio of phone-to-modem impedance for an ADSL system.
Figure 11:
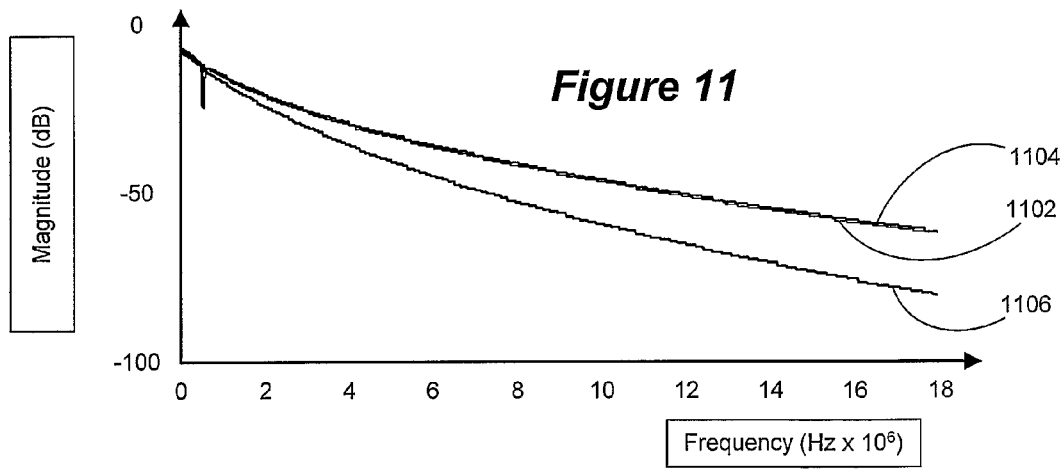
FIG. 11 illustrates the channel transfer function at the CPE of a DSL loop.
Figure 12:
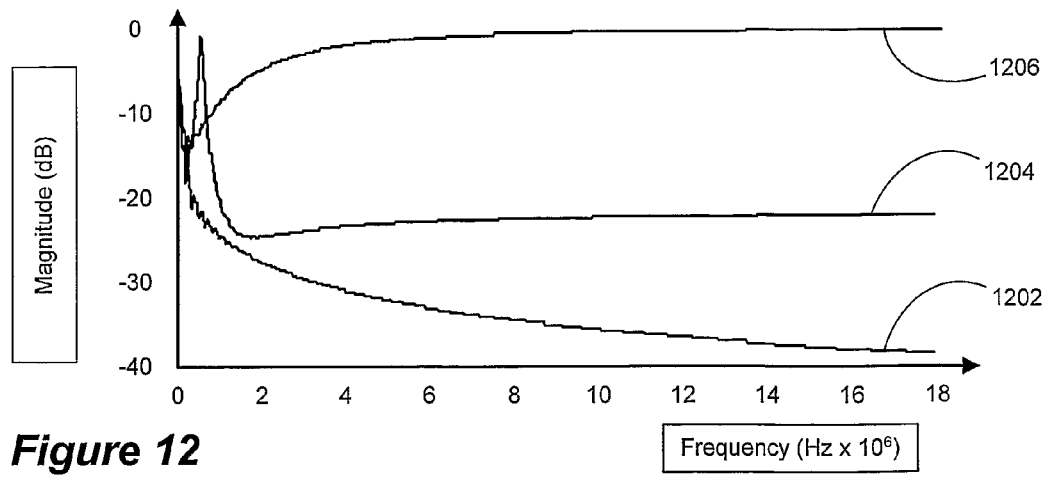
FIG. 12 illustrates the echo transfer function at the CPE of a DSL loop.

An approximation of the ratio of phone impedance to the modem's impedance for ADSL is shown in FIG. 10, clearly showing a dramatic impedance change between on-hook 1006 and off-hook 1004 phone states when a micro-filter is missing. To demonstrate the effect for VDSL, the channel transfer function and the echo transfer function at the CPE are shown in FIGS. 11 and 12, depicting a 2 kft loop with a phone located right next to the CPE modem. The channel and echo again change significantly between the phone states of on-hook and off-hook, when the micro-filter is missing. In FIG. 11 the channel with a micro-filter 1102 and channel without a micro-filter with the phone in the off-hook state 1104 are nearly identical, except at some low frequencies. The channel with the line missing a micro-filter with the phone in the off-hook state 1106 differs more. In FIG. 12 the echo response for the line possessing a micro-filter 1202 differs dramatically from the line's echo response without a micro-filter when the phone is in the off-hook state 1204 and in the on-hook state 1206.

Figure 13:
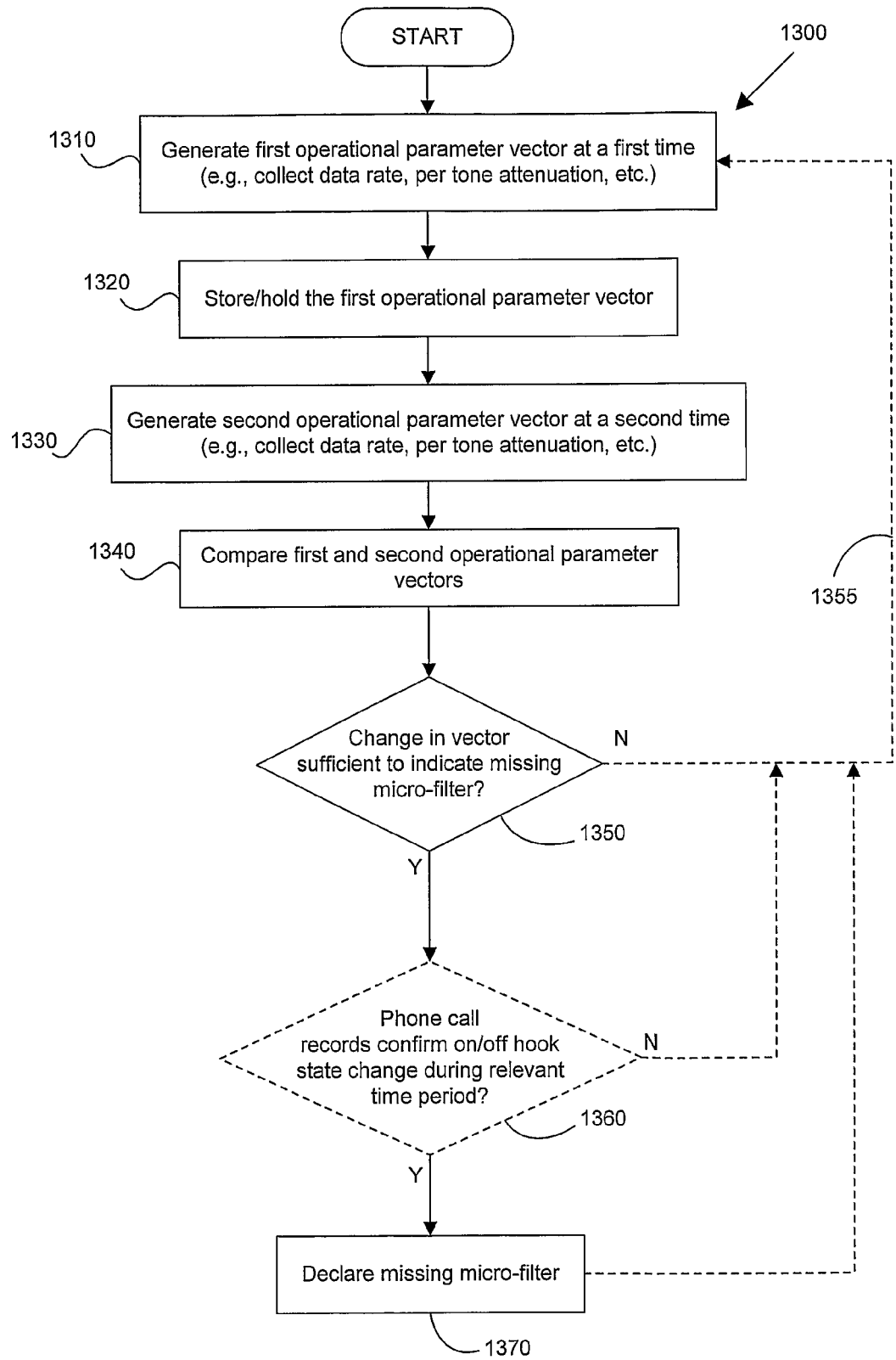
FIG. 13 is another flow diagram of one or more methods according to one or more embodiments of the present invention.

For ADSL or VDSL, using embodiments of the present invention, a missing micro-filter can be detected by noting changes in the operational parameters of the DSL system when the phone state changes from on-hook to off-hook or vice versa. Such operational parameters can include (but are not limited to) one or more of the following: channel average attenuation measurements, LATN, SATN, channel bit distributions, channel transmit power levels, reported current data rates, reported maximum attainable data rates, reported error-correction-parity, reported use of trellis codes, measured channel insertion loss, HLOG[n], measured channel gain, measured channel phase, inferred data regarding individual users' power levels, operational data regarding individual users' power levels, inferred data regarding individual users' PSD levels, operational data regarding individual users' PSD levels, inferred data regarding individual users' code settings, operational data regarding individual users' code settings, inferred data regarding the parameterized shaped PSDs of potential noises, operational data regarding the parameterized shaped PSDs of potential noises, the frequency/tone index of highest noise change in a recent time interval, the total number of bit-swaps occurring in a recent time interval, the distribution of FEC errors, code violations or errored seconds violations over several successive sub-intervals of a time interval, measured noise power variations, measured peak-to-average power ratio, measured channel logarithmic magnitude, measured quiet-line noise levels, measured active-line noise levels, mean square error per tone, MSE[n], signal-to-noise ratio per tone, SNR[n], count of ATM or other protocol cells, measured higher-level protocol-throughput, count of retraining, count of failed synchronization attempts, reported carrier mask, reported tone-shaping parameters, inferred data regarding vectored or matrix channel characterization, echo response, received echo noise, loop impedance, and others. Methods according to these embodiments of the present invention are shown in FIG. 13. Process 1300 begins with generating a first operational parameter vector at a first point in time at 1310, for example by collecting one or more parameter values for data rate, per tone attenuation, etc. This first operational parameter vector is stored or held at 1320, for example, in a database or the like. At 1330 a second operational parameter vector is generated at a second point in time. The first and second operational parameter vectors are compared at 1340, after which an evaluation 1350 is performed to determine whether sufficient change has occurred to indicate that a micro-filter is missing on the line being evaluated (for example, a large data rate change). If so, then a missing micro-filter declaration can be made at 1370. As indicated by line 1355, process 1300 can be repeated with other lines or on the same line whether or not a micro-filter has been declared missing.

A DSL modem may retrain to a lower data rate when a phone with a missing micro-filter goes to the off-hook state. Even after the phone is returned to the on-hook state, the modem will not retrain and thus will remain at the low rate until another event causes a retrain. Therefore, in one embodiment of the present invention, lines with large net data rate fluctuations over a long time period (e.g., a week or month) can be identified as potential "missing micro-filter lines" within a DSL network. Maximum attainable data rate may also be used for those modems that do not update the maximum attainable data rate during SHOWTIME. Also, reported upstream attenuation, downstream attenuation or the per tone attenuation may be used for those modems that do not update them during SHOWTIME. Finally, changes in the echo response at the CPE or the loop impedance as seen from the CPE can be used to detect a missing micro-filter, as seen in FIGS. 10-12.

The above techniques can be further enhanced to avoid false positive detections, for example when an abrupt change in the noise spectrum is incorrectly identified as a missing micro-filter effect. If historical data such as a record or history of phone calls is available (for example, in a database, library and/or other information source), then this record can be used in conjunction with collected operational data. The phone-call record would contain information such as the time and the duration of a phone call. Thus, the phone-call record implicitly contains information about when the phone changed from on-hook to off-hook and vice versa. In FIG. 13, the use of phone call records at 1360 is optional and allows for confirmation of implicit decision making at 1350, if desired.

Phone call records and information about the DSL retraining/outage time information also can be correlated to examine if the phone calls caused retraining of the DSL system. In some cases, the DSL service can run at a low data rate at the off-hook state. In other cases, an outage of the DSL service is observed when the phone is in the off-hook state.

Moreover, customers may call a DSL operator's call center to report poor DSL performance. If a customer is calling using the same line as used for DSL, then operational data during the customer call and also operational data after the call can be collected for comparison. In some embodiments of the present invention, a retraining might be forced just before the second data collection. If the current data rates or maximum attainable data rates of the two data sets differ significantly, then a micro-filter can be suspected.

When the phone service is off-hook (in use), the modem may synch to a low data rate with a low margin. Because of the POTS signal interference, code violations or FEC corrections may be observed to be high during the period of the phone call. Therefore, one or more of the code-violations/retraining-time/current-date-rate/max-data-rate can be correlated to detect a missing micro-filter. If a phone call time record also is available, the time period of occurrence of code violations (CV) or errored seconds (ES) might be correlated with the phone call time record. This method also applies to any DSL system that uses seamless rate adaptation or dynamic rate repartitioning during SHOWTIME.

The impedance or echo seen from a DSL modem also can be measured during on-hook and off-hook and compared with the same parameters and/or performance of lines that are known to have micro-filters. If the information is made available to an operator or the like (e.g., via a DSM center, dynamic spectrum manager or the like), a missing micro-filter can be detected. When this information is not available, changes in bit distribution, noise spectrum, SNR etc. can be monitored to detect missing micro-filters.

The estimated system configuration can be determined using a maximum likelihood (ML) methodology in some cases. In such ML methodologies, which are well known to those skilled in the art and can be readily adapted for use in connection with embodiments of the present invention after consulting this disclosure, certain comparisons and other data may be weighted more heavily, depending upon the likelihood of one configuration relative to another. Such likelihood can depend on known characteristics or likely characteristics of the loop inferred from phone-company records, previous data collected on previous uses of the line, or general practices inferred from a mass of data collecting over a large body of such systems over time. Other methodologies that can be used with or in place of maximum likelihood approaches are also well known to those skilled in the art.

Maximum likelihood, defining a measure of closeness, attempts to find among the set of postulated models the model that has the smallest difference from the collected data—or equivalently is thus the most likely system configuration. Several measures of closeness, along with several parameterized sets of channel models, may be defined and used as the process proceeds and more is learned about what works best. This may depend on service provider practices, binder manufacturers, noises in different areas, etc.

For example, it may be possible to base a prediction or estimate on at least the reported maximum rate, bit table, current rate, margin at that rate and attenuation from the minimally reporting current DSL systems in the field. Such information can be processed by the estimator and compared estimations regarding a number of postulated line lengths, with or without bridged taps and various loop faults, that would generally conform to the downstream and upstream attenuation reported. These estimates can then be compared to the reported values to see how closely they reproduce the current rate, margin, and maximum rate for the reported data. Of particular importance, proximity to the current bit distribution shape may be very helpful in assessing a best or reasonable parameterized model for the estimator (for instance bit distributions with holes may indicate the presence of bridged taps and/or narrowband radio noise).

During this process, each potential model's likelihood of accuracy can be evaluated. One or more models that best fit the collected operational data and any other empirical evidence can be chosen to serve as a model (or models) for considering improvements and/or other changes to the system. Again, the likelihood of a model's accuracy can be based on various indicators of system performance, such as:

Observed operational data (generated by users' "normal" use of the system) that shows operating performance based on normal operation signals; and/or Test data (generated by testing normally conducted on the system) that shows operating performance; and/or Prompted operational data (generated by stimulating the xDSL system) that shows operating performance based on stimulation signals.

The model(s) can be continuously/periodically updated and revised, depending on the data collected and evaluated (or may be updated on a non-periodic and/or prompted basis).

In some instances, collected and/or reported values or parameters may be used by a controller (such as a dynamic spectrum manager) to identify the type and manufacturer of a modem. For instance, the controller may know that certain combinations of various reported values only occur for a given manufacturer or a specific type of modem. The controller may learn over time with accumulated measurements that certain modems have certain types of reporting and thus be more accurate in predicting whose modem it is. This may be particularly appropriate to estimated high-noise tones, where noise changes by large amounts (or has been observed to change by a large amount) or by several successive reports of FEC error distributions.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 14:
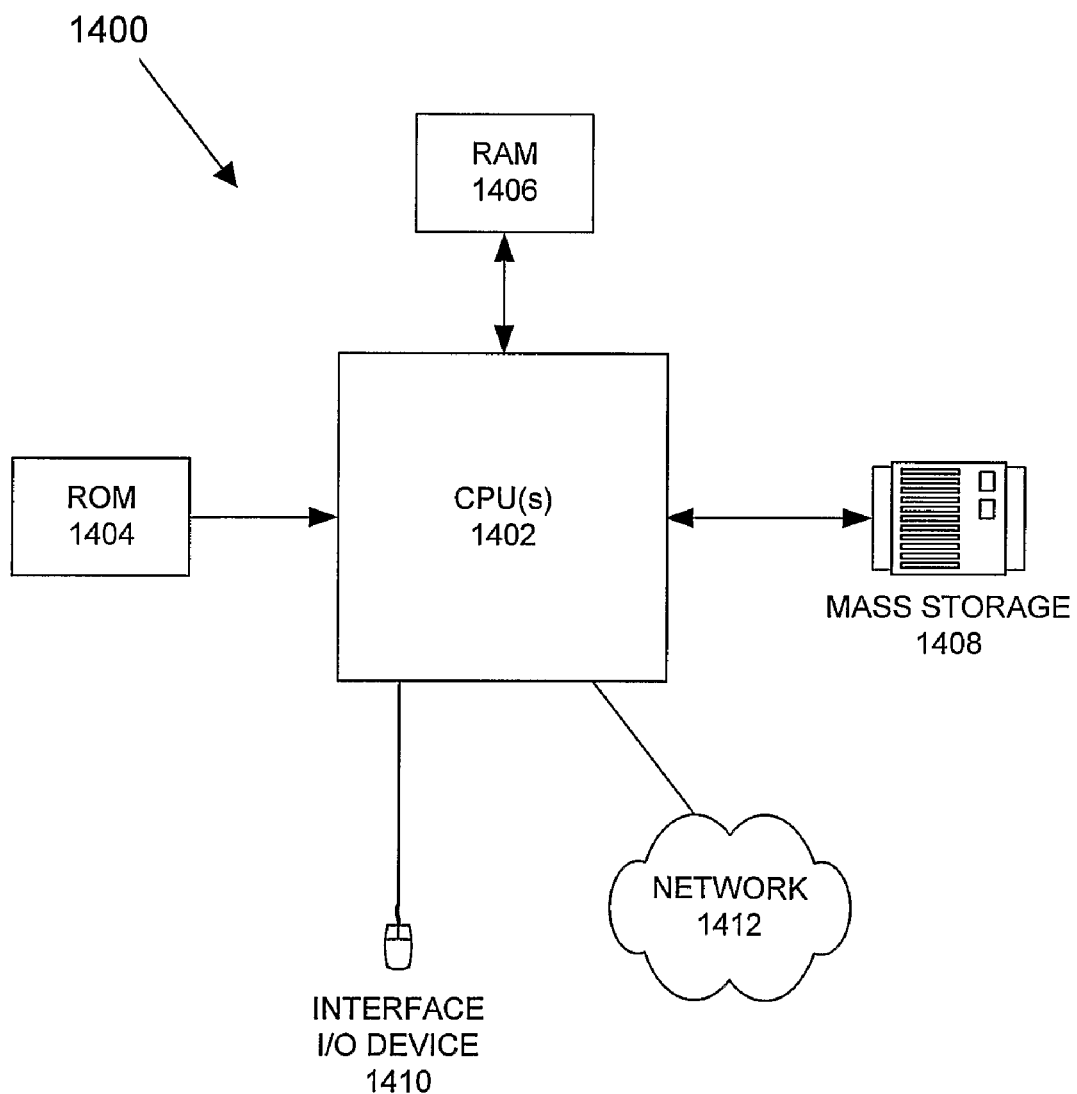
FIG. 14 is a block diagram of a typical computer system suitable for implementing embodiments of the present invention.

FIG. 14 illustrates a typical computer system that can be used by a user and/or controller in accordance with one or more embodiments of the present invention. The computer system 1400 includes any number of processors 1402 (also referred to as central processing units, or CPUs) that are coupled to storage devices including primary storage 1406 (typically a random access memory, or RAM), primary storage 1404 (typically a read only memory, or ROM). As is well known in the art, primary storage 1404 acts to transfer data and instructions uni-directionally to the CPU and primary storage 1406 is used typically to transfer data and instructions in a bi-directional manner. Both of these primary storage devices may include any suitable of the computer-readable media described above. A mass storage device 1408 also is coupled bi-directionally to CPU 1402 and provides additional data storage capacity and may include any of the computer-readable media described above. The mass storage device 1408 may be used to store programs, data and the like and is typically a secondary storage medium such as a hard disk that is slower than primary storage. It will be appreciated that the information retained within the mass storage device 1408, may, in appropriate cases, be incorporated in standard fashion as part of primary storage 1406 as virtual memory. A specific mass storage device such as a CD-ROM 1414 may also pass data uni-directionally to the CPU.

CPU 1402 also is coupled to an interface 1410 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1402 optionally may be coupled to a computer or telecommunications network using a network connection as shown generally at 1412. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 1408 or 1414 and executed on CPU 1402 in conjunction with primary memory 1406. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method for estimating a DSL system test loop configuration, the method comprising:
    collecting operational data from a DSL system test loop comprising a first DSL transceiver at a near end of the test loop and a second DSL transceiver at a far end of the test loop, wherein the operational data is a result of transmissions between the first and second transceiver;
    generating a test loop parameter vector from the collected operational data, wherein the test loop parameter vector comprises one or more loop-dependent parameter values, further wherein the test loop parameter vector includes parameters directly collected or derived from the operational data;
    selecting a reference parameter vector corresponding to a reference loop configuration, wherein the reference parameter vector includes reference values characterizing the presence or absence of a condition on a hypothetical or ideal loop free from the condition, wherein the condition is a bridged tap or the condition is a bad splice;
    comparing the test loop parameter vector and the reference parameter vector; and
    detecting the condition on the test loop, based on the comparison between the test loop parameter vector and the reference parameter vector.

2. The method of claim 1 wherein the test loop parameter vector comprises at least one of the following:
    channel attenuation per tone;
    channel attenuation averaged over a group of tones;
    loop attenuation (LATN); signal attenuation (SATN);
    estimated upstream power back-off electrical length (UPBOKLE);
    HLOG[n]; or receiver noise per tone estimated assuming a channel attenuation per tone corresponding to a loop with no bridged taps.

3. The method of claim 1 wherein comparing the test loop parameter vector and the reference parameter vector comprises computing the difference between the test loop parameter vector and the reference parameter vector, the method further comprising:
    selecting the reference loop configuration to correspond to a reference loop with no bridged taps, wherein the condition is the presence of a bridged tap;
    locating peaks in the computed difference between the test loop parameter vector and the reference parameter vector;
    estimating the size of any located peaks; and
    declaring the presence of a bridged tap on the DSL system test loop based on the location and estimated size of any located peaks.

4. The method of claim 3 further comprising estimating the length of the bridged tap based on the location of the peaks.

5. The method of claim 3 wherein declaring the presence of a bridged tap comprises:
    identifying a positive peak when the size of a located peak is larger than a positive peak size threshold;
    identifying a negative peak when the size of a located peak is smaller than a negative peak size threshold;
    counting the number of identified positive peaks;
    counting the number of identified negative peaks;
    declaring the presence of a bridged tap when:
        the number of identified positive peaks exceeds a positive peak count threshold, and
        the number of identified negative peaks exceeds a negative peak count threshold.

6. The method of claim 5 further comprising adjusting at least one of the following:
    the positive peak size threshold;
    the negative peak size threshold;
    the positive peak count threshold; or
    the negative peak count threshold.

7. The method of claim 4 wherein estimating the length of the bridged tap comprises at least one of the following:
    estimating the length of a bridged tap that corresponds to the identified location of at least one positive peak; or
    estimating the length of a bridged tap that corresponds to the identified location of at least one negative peak.

8. The method of claim 1 wherein the test loop parameter vector comprises a test loop echo-dependent parameter vector obtained from operational data collected from the test loop;
    further wherein the condition is the presence of a bridged tap, and the reference loop configuration comprises a reference loop configuration with no bridged tap;
    further wherein the reference parameter vector comprises a reference echo-dependent parameter vector corresponding to the reference loop configuration with no bridged tap;
    further wherein the method further comprises:
    computing the difference between the test loop echo-dependent parameter vector and the reference echo-dependent parameter vector;
    wherein the method comprises estimating a location of a bridged tap from the computed difference between the echo-dependent parameter vector and the reference echo-dependent parameter vector.

9. The method of claim 8 wherein the echo-dependent parameter vector comprises at least one of the following:
    an echo response;
    a loop impedance; or
    a receiver noise per tone.

10. The method of claim 1 wherein the condition is the presence of a bad splice, and the reference loop configuration has no bad splice; further wherein the method further comprises:
    computing a difference between the test loop parameter vector and the reference parameter vector; and
    declaring the presence of a bad splice in the test loop when the computed difference is larger than a first threshold.

11. The method of claim 1 wherein the condition is the presence of a bad splice, and the reference loop configuration has no bad splice;
    further wherein the method further comprises: detecting a frequency set for which the difference between the test loop parameter vector and the reference parameter vector is larger than a first threshold; and
    declaring a bad splice when the detected frequency set is within a first frequency range.

12. The method of claim 10 wherein the test loop parameter vector comprises at least one of the following:
    channel attenuation per tone;
    channel attenuation averaged over a group of tones;
    loop attenuation (LATN);
    signal attenuation (SATN);
    estimated upstream power back-off electrical length (UPBOKLE);
    HLOG[n]; or receiver noise per tone estimated assuming a loop with no bad splice.

13. The method of claim 10 wherein the test loop parameter vector comprises an echo-dependent parameter vector based on operational data collected from the DSL system;
further wherein the reference parameter vector comprises a reference echo-dependent parameter vector corresponding to the reference loop configuration; further wherein the method comprises:
computing the difference between the echo-dependent parameter vector and the reference echo-dependent parameter vector; and
estimating the location of a bad splice from the computed difference between the echo-dependent parameter vector and the reference echo-dependent parameter vector.

14. The method of claim 13 wherein the echo-dependent parameter vector comprises at least one of the following:
an echo response;
a loop impedance; or
a receiver noise per tone.

15. A method for detecting a problem with a micro-filter in a DSL system loop, the method comprising:
generating a first operational parameter vector based on operational data of the DSL system, the operational data providing a state of the DSL system loop when a phone that shares the DSL system loop is in an on-hook state;
generating a second operational parameter vector based on operational data of the DSL system, the operational data providing a state of the DSL system loop when a phone that shares the DSL system loop is in an off-hook state;
comparing the first operational parameter vector to the second operational parameter vector; and
declaring a problem with the micro-filter based on the comparison of the first and second operational parameter vectors, wherein declaring a problem with the micro-filter comprises confirming from phone call record information that the phone state changed between an on-hook state and an off-hook state between the generation of the first operational parameter vector and the generation of the second operational parameter vector.

16. The method of claim 15 wherein each of the first and second operational parameter vectors comprises at least one of the following:
channel average attenuation measurements;
loop attenuation (LATN);
signal attenuation (SATN);
estimated upstream power back-off electrical length (UP-BOKLE);
channel bit distributions;
channel transmit power levels;
reported current data rates;
reported maximum attainable data rates;
reported error-correction-parity;
reported use of trellis codes;
measured channel insertion loss; HLOG[n];
measured channel gain;
measured channel phase;
inferred data regarding individual users' power levels;
operational data regarding individual users' power levels;
inferred data regarding individual users' power spectral density (PSD) levels;
operational data regarding individual users' PSD levels;
inferred data regarding individual users' code settings;
operational data regarding individual users' code settings;
inferred data regarding the parameterized shaped PSDs of potential noises;
operational data regarding the parameterized shaped PSDs of potential noises;
the frequency/tone index of highest noise change in a recent time interval;
the total number of bit-swaps occurring in a recent time interval;
the distribution of forward error correction (FEC) errors, code violations or errored seconds violations over several successive sub-intervals of a time interval;
measured noise power variations;
measured peak-to-average power ratio;
measured channel logarithmic magnitude;
measured quiet-line noise levels;
measured active-line noise levels;
mean square error per tone;
signal-to-noise ratio per tone (SNR[n]);
count of ATM or other protocol cells;
measured higher-level protocol-throughput;
count of retraining;
count of failed synchronization attempts; reported carrier mask;
reported tone-shaping parameters;
inferred data regarding vectored or matrix channel characterization;
echo response;
received echo noise; or
loop impedance.

17. The method of claim 15 wherein declaring a problem with the micro-filter based on the comparison of the first and second operational parameter vectors comprises declaring a missing micro-filter when the difference between the first operational parameter vector and the second operational parameter vector exceeds a threshold.

18. The method of claim 15 wherein declaring a problem with the micro-filter based on the comparison of the first and second operational parameter vectors comprises declaring a missing micro-filter when:
the first operational parameter vector and the second operational parameter vector indicate that a retrain occurred between the generation of the first operational parameter vector and the generation of the second operational parameter vector.

19. The method of claim 15 wherein declaring a problem with the micro-filter based on the comparison of the first and second operational parameter vectors comprises declaring a missing micro-filter when the first operational parameter vector and the second operational parameter vector indicate that, between the generation of the first operational parameter vector and the generation of the second operational parameter vector,
a large number of code violations, or a large number of FEC corrections occurred.

20. A computer program product comprising:
a non-transitory machine readable medium and program instructions contained in the machine readable medium, the program instructions specifying a method for estimating a DSL system test loop configuration, the method comprising:
collecting operational data from a DSL system test loop comprising a first DSL transceiver at a near end of the test loop and a second DSL transceiver at a far end of the test loop, wherein the operational data is a result of transmissions between the first and second transceiver;
generating a test loop parameter vector from the collected operational data, wherein the test loop parameter vector comprises one or more loop-dependent parameter values, further wherein the test loop parameter vector includes parameters directly collected or derived from the operational data;

selecting a reference parameter vector corresponding to a reference loop configuration, wherein the reference parameter vector includes reference values characterizing the presence or absence of a condition on a hypothetical or ideal loop free from the condition, wherein the condition is a bridged tap or the condition is a bad splice;

comparing the test loop parameter vector and the reference parameter vector; and detecting the condition on the test loop, based on the comparison between the test loop parameter vector and the reference parameter vector.

21. The computer program product of claim 20 wherein comparing the test loop parameter vector and the reference parameter vector comprises computing the difference between the test loop parameter vector and the reference parameter vector, and wherein the method further comprises:

selecting the reference loop configuration to correspond to a reference loop with no bridged taps, wherein the condition is the presence of a bridged tap;

locating peaks representing the computed difference between the test loop parameter vector and the reference parameter vector;

estimating the size of any located peaks; and declaring the presence of a bridged tap on the DSL system test loop based on the location and estimated size of any located peaks.

22. The computer program product of claim 20 wherein the test loop parameter vector comprises a test loop echo-dependent parameter vector obtained from operational data collected from the test loop;

further wherein the condition is the presence of a bridged tap, and the reference loop configuration comprises a reference loop configuration with no bridged tap;

further wherein the reference parameter vector comprises a reference echo-dependent parameter vector corresponding to the reference loop configuration with no bridged tap;

further wherein the method further comprises:

computing the difference between the test loop echo-dependent parameter vector and the reference echo-dependent parameter vector; and wherein the method comprises estimating a location of a bridged tap from the computed difference between the echo-dependent parameter vector and the reference echo-dependent parameter vector.

23. The computer program product of claim 20 wherein the condition is the presence of a bad splice, and the reference loop configuration has no bad splice;

further wherein the method further comprises:

computing a difference between the test loop parameter vector and the reference parameter vector; and declaring the presence of a bad splice in the test loop when the computed difference is larger than a first threshold.

24. The computer program product of claim 23 wherein the test loop parameter vector comprises an echo-dependent parameter vector based on operational data collected from the DSL system;

further wherein the reference parameter vector comprises a reference echo-dependent parameter vector corresponding to the reference loop configuration;

further wherein the method further comprises:

computing the difference between the echo-dependent parameter vector and the reference echo-dependent parameter vector; and estimating the location of a bad splice from the computed difference between the echo-dependent parameter vector and the reference echo-dependent parameter vector.

25. A computer program product comprising:

a non-transitory machine readable medium and program instructions contained in the machine readable medium, the program instructions specifying a method for detecting a problem with a micro-filter in a DSL loop, the method comprising:

generating a first operational parameter vector based on operational data of the DSL system, the operational data providing a state of the DSL system loop when a phone that shares the DSL system loop is in an on-hook state;

generating a second operational parameter vector based on operational data of the DSL system, the operational data providing a state of the DSL system loop when a phone that shares the DSL system loop is in an off-hook state;

comparing the first operational parameter vector to the second operational parameter vector; and declaring a problem with the micro-filter based on the comparison of the first and second operational parameter vectors, wherein declaring a problem with the micro-filter comprises confirming from phone call record information that the phone state changed between an on-hook state and an off-hook state between the generation of the first operational parameter vector and the generation of the second operational parameter vector.

26. A controller comprising:

a data collection unit coupled to a data analysis unit and a control signal generator coupled to the data analysis unit, to:

obtain a test loop parameter vector from operational data collected from a test loop of a DSL system comprising a first DSL transceiver at a near end of the test loop and a second DSL transceiver at a far end of the test loop, wherein the operational data is a result of transmissions between the first and second transceiver, wherein the test loop parameter vector comprises one or more loop-dependent parameter values, further wherein the test loop parameter vector includes parameters directly collected or derived from the operational data;

select a reference parameter vector corresponding to a reference loop configuration, wherein the reference parameter vector includes reference values characterizing the presence or absence of a condition on a hypothetical or ideal loop free from the condition, wherein the condition is a bridged tap or the condition is a bad splice;

compare the test loop parameter vector and the reference parameter vector; and detect the condition on the test loop, based on the comparison of the test loop parameter vector and the reference parameter vector.

27. The controller of claim 26 wherein the compare of the test loop parameter vector and the reference parameter vector computes a difference between the test loop parameter vector and the reference parameter vector, and wherein the data collection unit, the data analysis unit and the signal generator further:

select the reference loop configuration to correspond to a reference loop with no bridged taps, wherein the condition is the presence of a bridged tap;

locate peaks in the computed difference between the test loop parameter vector and the reference parameter vector;

estimate the size of any located peaks; and declare the presence of a bridged tap on the DSL system test loop based on the location and estimated size of any located peaks.

28. The controller of claim 26 wherein the test loop parameter vector comprises a test loop echo-dependent parameter vector obtained from operational data collected from the test loop;

further wherein the condition is the presence of a bridged tap, and the reference loop configuration comprises a reference loop configuration with no bridged tap;

further wherein the reference parameter vector comprises a reference echo-dependent parameter vector corresponding to the reference loop configuration with no bridged tap;

further wherein the data collection unit, the data analysis unit and the signal generator are further to:

compute the difference between the test loop echo-dependent parameter vector and the reference echo-dependent parameter vector; and estimate a location of a bridged tap from the computed difference between the echo-dependent parameter vector and the reference echo-dependent parameter vector.

29. The controller of claim 26 wherein the condition is the presence of a bad splice, and the reference loop configuration has no bad splice;

further wherein the data collection unit, the data analysis unit and the signal generator further:

compute a difference between the test loop parameter vector and the reference parameter vector; and declare the presence of a bad splice in the test loop when the computed difference is larger than a first threshold.

30. A controller comprising:

a data collection unit coupled to a data analysis unit and a control signal generator coupled to the data analysis unit, wherein the data collection unit, the data analysis unit and the signal generator:

generate a first operational parameter vector based on operational data pertaining to a DSL system, the operational data providing a state of the DSL system loop when a phone that shares the DSL system loop is in an on-hook state;

generate a second operational parameter vector based on operational data of the DSL system, the operational data providing a state of the DSL system loop when a phone that shares the DSL system loop is in an off-hook state;

compare the first operational parameter vector to the second operational parameter vector; and declare a problem with the micro-filter based on the comparison of the first and second operational parameter vectors when phone call record information indicates that the phone state changed between an on-hook state and an off-hook state between the generation of the first operational parameter vector and the generation of the second operational parameter vector.

* * * * *